(12) United States Patent
Inoue

(10) Patent No.: US 8,352,972 B2
(45) Date of Patent: Jan. 8, 2013

(54) DISK SORTER AND DISK PROCESSOR

(75) Inventor: Satoru Inoue, Musashino (JP)

(73) Assignee: TEAC Corporation, Tokyo (JP)

( * ) Notice: Subject to any disclaimer, the term of this patent is extended or adjusted under 35 U.S.C. 154(b) by 581 days.

(21) Appl. No.: 12/622,370

(22) Filed: Nov. 19, 2009

(65) Prior Publication Data

US 2010/0125861 A1 May 20, 2010

(30) Foreign Application Priority Data

Nov. 19, 2008 (JP) .................................. 2008-295705

(51) Int. Cl.
*G11B 17/16* (2006.01)

(52) U.S. Cl. ...................................... 720/600; 720/652

(58) Field of Classification Search .......... 720/600–606, 720/610–616, 626, 645, 652–657, 695, 703–717; 101/40; 347/104
See application file for complete search history.

(56) References Cited

U.S. PATENT DOCUMENTS

| | | | |
|---|---|---|---|
| 7,127,725 B2 | 10/2006 | Lee | |
| 7,249,678 B2 * | 7/2007 | Schieleit | 209/655 |
| 2004/0057347 A1 * | 3/2004 | Lee | 369/30.32 |
| 2006/0242656 A1 * | 10/2006 | Woo | 720/600 |
| 2008/0250437 A1 * | 10/2008 | Honma | 720/601 |

FOREIGN PATENT DOCUMENTS

| | | |
|---|---|---|
| JP | 2002-237123 A | 8/2002 |
| JP | 2005352203 A | 12/2005 |

OTHER PUBLICATIONS

Japanese Office Action issued in corresponding JP Application No. 2008-295705, dated May 28, 2012, 5 pages.

* cited by examiner

*Primary Examiner* — Nathan Danielsen
(74) *Attorney, Agent, or Firm* — Seed IP Law Group PLLC

(57) ABSTRACT

A disk sorter for DVDs, CDs or other disks includes a sorter frame. Plural sorting trays are contained in the sorter frame in a multi-level arrangement, respectively have a front tray end and a rear tray end, are inclined downwards toward the front tray end, for containing a disk on a side higher than the front tray end upon reception with the rear tray end. A movable chute structure is disposed behind the rear tray end, movable up or down, inclined downwards toward the rear tray end, for supplying one of the sorting trays with the disk by guiding to the rear tray end. A disk transfer device holds the disk, and places the disk on the chute structure, to transfer to the one sorting tray. Furthermore, a lifting device moves up or down the chute structure, and positions the chute end at the rear tray end.

14 Claims, 21 Drawing Sheets

DISK SORTER AND DISK PROCESSOR

BACKGROUND OF THE INVENTION

1. Field of the Invention

The present invention relates to a disk sorter and disk processor. More particularly, the present invention relates to a disk sorter and disk processor in which disks can be taken out easily one after another.

2. Description Related to the Prior Art

A disk processor is known and commercially marketed in the field of instruments for data recording. The disk processor writes data to a great number of disks, such as CDs and DVDs, and also prints a label on each of the disks. JP-A 2002-237123 discloses the disk processor in which a disk storage unit contains plural disks, and each one of those is moved and processed in data writing and label printing. The processed disk is transferred to another one the disk storage unit. Numerous disks are stacked one over another.

For stacking the processed disks in the disk processor, a first disk processed in the data writing and the label printing is stored as a lowest disk in the storage. Succeeding disks are stacked one over another in an upward direction in the order of the processing.

However, disks are stacked one over another during the data writing and the label printing. The processed disk cannot be taken out from the disk storage unit.

U.S. Pat. No. 7,127,725 discloses a sorter in which plural sorting trays are installed. The processed disks are discharged in the sorting trays.

In U.S. Pat. No. 7,127,725, a chute structure is associated with each of the sorting trays. A disk is moved from the chute structure to a disk receiving component. There is a problem of a complicated construction as the chute structure is required for each of the sorting trays.

SUMMARY OF THE INVENTION

In view of the foregoing problems, an object of the present invention is to provide a disk sorter and disk processor in which disks can be taken out easily one after another.

In order to achieve the above and other objects and advantages of this invention, a disk sorter includes plural sorting trays, arranged with an inclination and in a multi-level arrangement, having a front tray end and a rear tray end, for containing a disk upon passing the rear tray end so as to enable takeout of the disk at the front tray end. A movable chute structure is disposed behind the plural sorting trays, for moving up and down to a position of a path of a selected one of the sorting trays. A shiftable disk transfer device holds the disk in a removable manner, and places the disk on to the chute structure, to transfer the disk into the selected sorting tray from the chute structure.

The sorting trays are movable rotationally about a point located close to the rear tray end so as to raise the front tray end.

Furthermore, at least one rail portion guides the chute structure to move up or down.

Furthermore, a lifting device moves up or down the chute structure, and positions a chute end thereof at the rear tray end.

The disk transfer device is secured to the lifting device. Furthermore, a coupling device retains the chute structure on the disk transfer device when the disk transfer device is disposed close to the chute structure at a predetermined height, to move together up and down.

The coupling device includes a retention claw disposed on the disk transfer device. A claw receiving surface is disposed on the chute structure, for retention of the retention claw when the disk transfer device moves up to a predetermined height.

Furthermore, a shifting device shifts the disk transfer device between a chute position of an upside of the chute structure and a ready position offset laterally from the chute structure. The coupling device operates for retention upon shifting of the disk transfer device to the chute position.

The disk transfer device is slidable to an upper end position in an upward direction. Furthermore, a release pin is disposed near to the upper end position of the disk transfer device. A lever portion is formed to extend from the retention claw, movable up or down pivotally on the disk transfer device, pushed by the release pin upon sliding of the disk transfer device to the upper end position, for disengaging the retention claw from the claw receiving surface upon moving pivotally, to return the chute structure in a downward direction.

The lifting device includes a rail portion disposed to extend in an upward or downward direction. A carriage is secured to the rail portion in a slidable manner, for moving the chute structure. A motor slides the carriage along the rail portion.

The disk transfer device is secured to the carriage. Furthermore, a coupling device retains the chute structure on the carriage.

The chute structure is disposed to project from the carriage.

Furthermore, a stationary sorting tray is disposed under the sorting trays, and oriented at a path of the chute structure set in the initial position.

Also, a disk processor is provided, and includes a sorter frame. Plural sorting trays are contained in the sorter frame in a multi-level arrangement, respectively have a front tray end and a rear tray end, are inclined downwards toward the front tray end, for containing a disk on a side higher than the front tray end upon reception with the rear tray end. A movable chute structure is disposed behind the rear tray end, movable up or down, inclined downwards toward the rear tray end, for supplying one of the sorting trays with the disk by guiding to the rear tray end. A disk transfer device holds the disk, and places the disk on the chute structure, to transfer to the one sorting tray. A disk processing unit processes the disk. A disk storage unit contains an unprocessed disk. A tray mechanism is movable between first and second positions, disposed to project from the disk processing unit when in the first position for supply of the disk from the disk storage unit, and contained in the disk processing unit when in the second position. A disk moving assembly moves the disk by moving the disk transfer device between the disk storage unit, the disk processing unit, and the chute structure.

The tray mechanism in the first position is aligned with the chute structure in an upward or downward direction.

Furthermore, a processed disk storage unit is supplied with the processed disk by the disk processing unit, for containing the processed disk in a stacked manner.

The processed disk from the disk processing unit is transferred to the chute structure.

The disk processing unit is a data writer for writing data to the unprocessed disk, and/or a label printer for printing on the unprocessed disk.

Accordingly, disks can be taken out easily one after another, because one chute structure is sufficient for the discharge in combination with the plural sorting trays.

BRIEF DESCRIPTION OF THE DRAWINGS

The above objects and advantages of the present invention will become more apparent from the following detailed description when read in connection with the accompanying drawings, in which:

FIG. 9 is a perspective view, partially cutaway, illustrating the same as FIG. 8 but in which a hold detector is turned on;

DETAILED DESCRIPTION OF THE PREFERRED EMBODIMENT(S) OF THE PRESENT INVENTION

Figure 1:
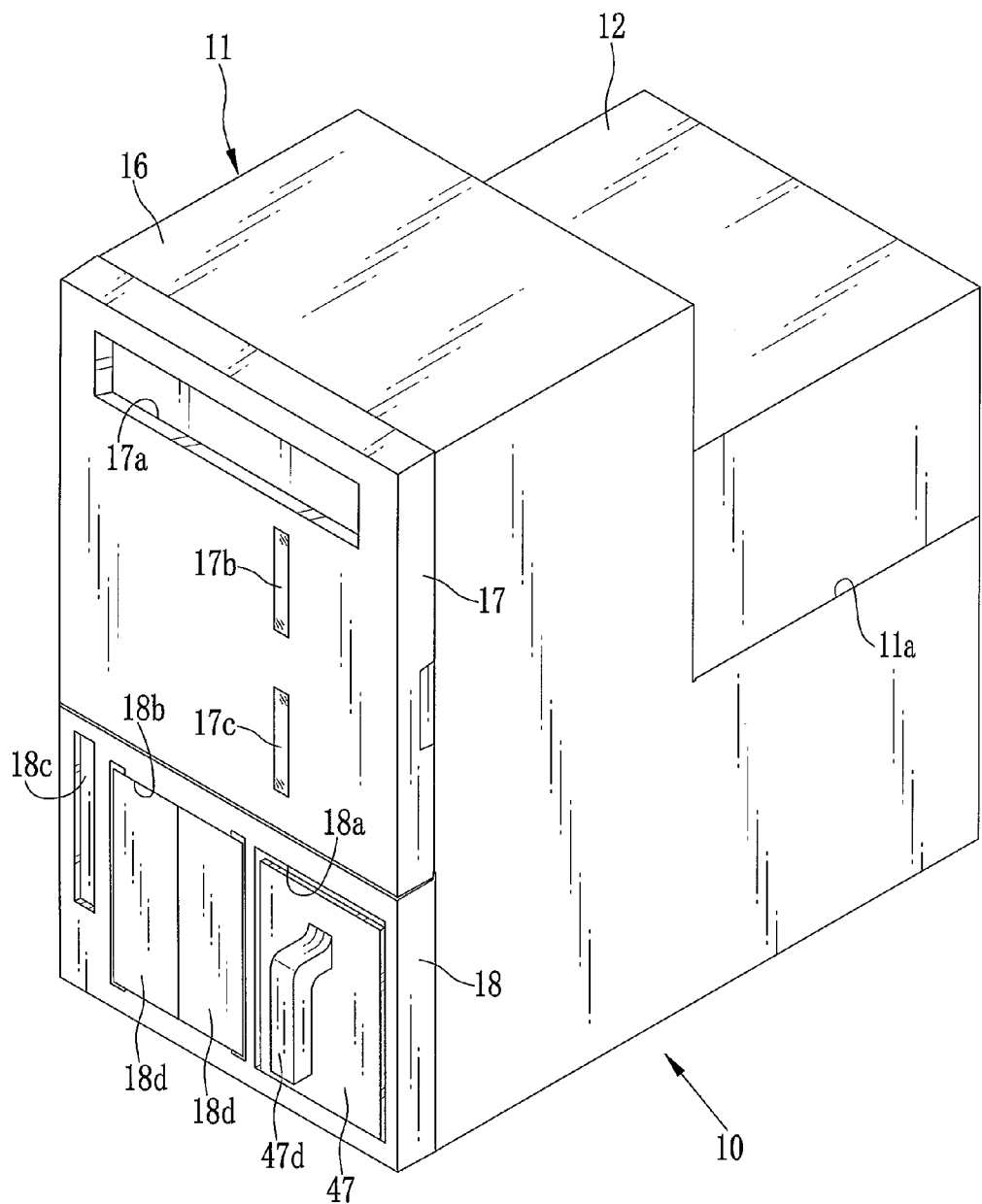
FIG. 1 is a perspective view illustrating a disk processor.

In FIG. 1, a disk processor 10 includes an apparatus body 11 and a label printer 12 as a disk processing unit. The apparatus body 11 has an L shape as viewed laterally. There is an upper surface 11a of a rear cutout in the apparatus body 11. The label printer 12 is mounted on the upper surface 11a for attachment. The label printer 12 is removable from the apparatus body 11. A separate form of the apparatus body 11 constitutes a data writer as a disk processor without label printing function.

Figure 2:
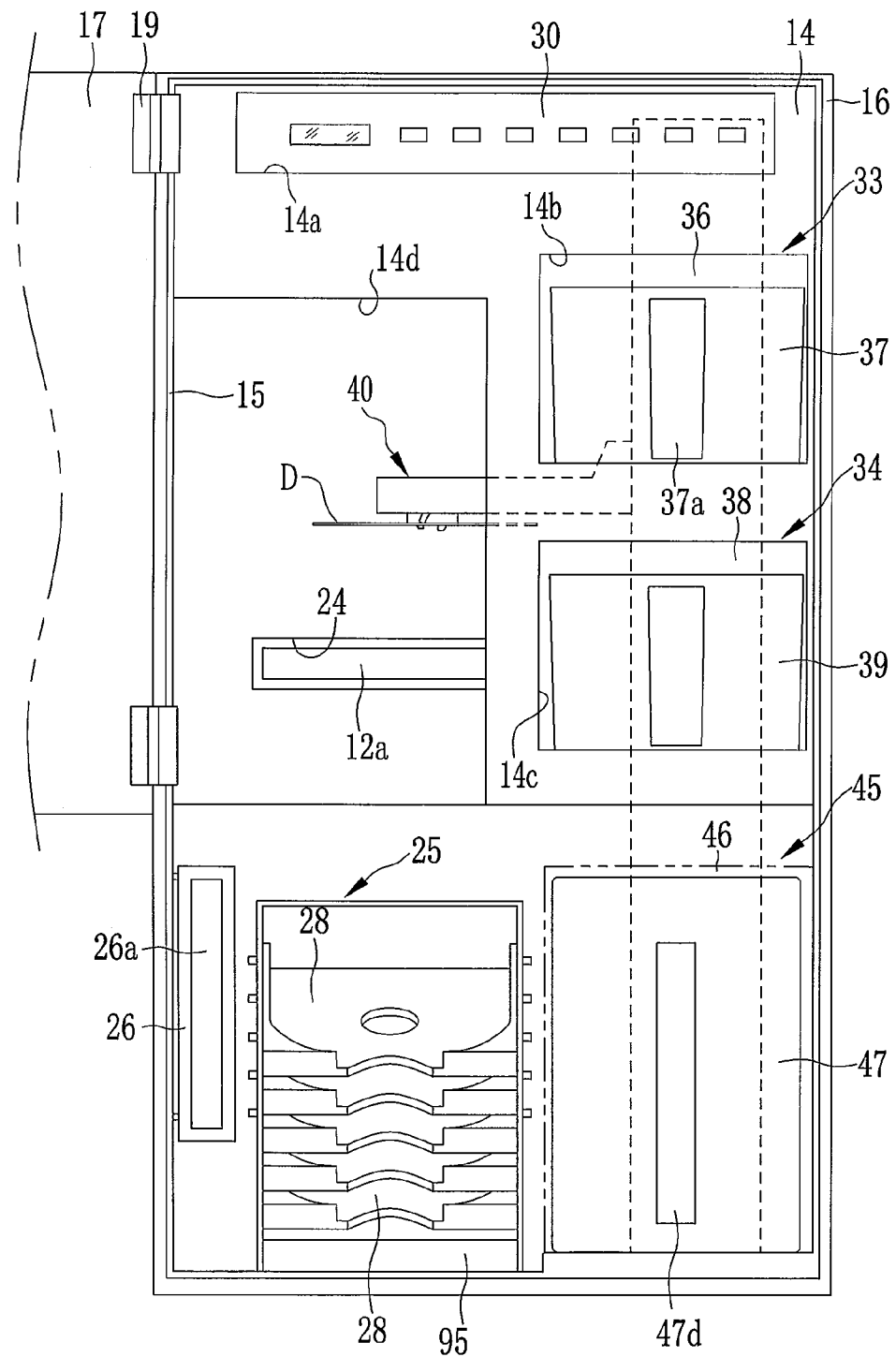
FIG. 2 is a front elevation illustrating the disk processor of which panels are eliminated.

In FIG. 2, the apparatus body 11 includes a frame 15, a casing 16, an upper panel 17 and a lower panel 18. The casing 16 covers the frame 15. The upper and lower panels 17 and 18 are attached to the frame 15 and cover the front of the casing 16. A hinge mechanism 19 secures the upper panel 17 to the frame 15 in an openable manner. The upper panel 17 covers an upper half of the front of the casing 16. A coupling device with claws secures the lower panel 18 to the frame 15 in a removable manner. The lower panel 18 covers a lower half of the front of the casing 16.

Figure 3:
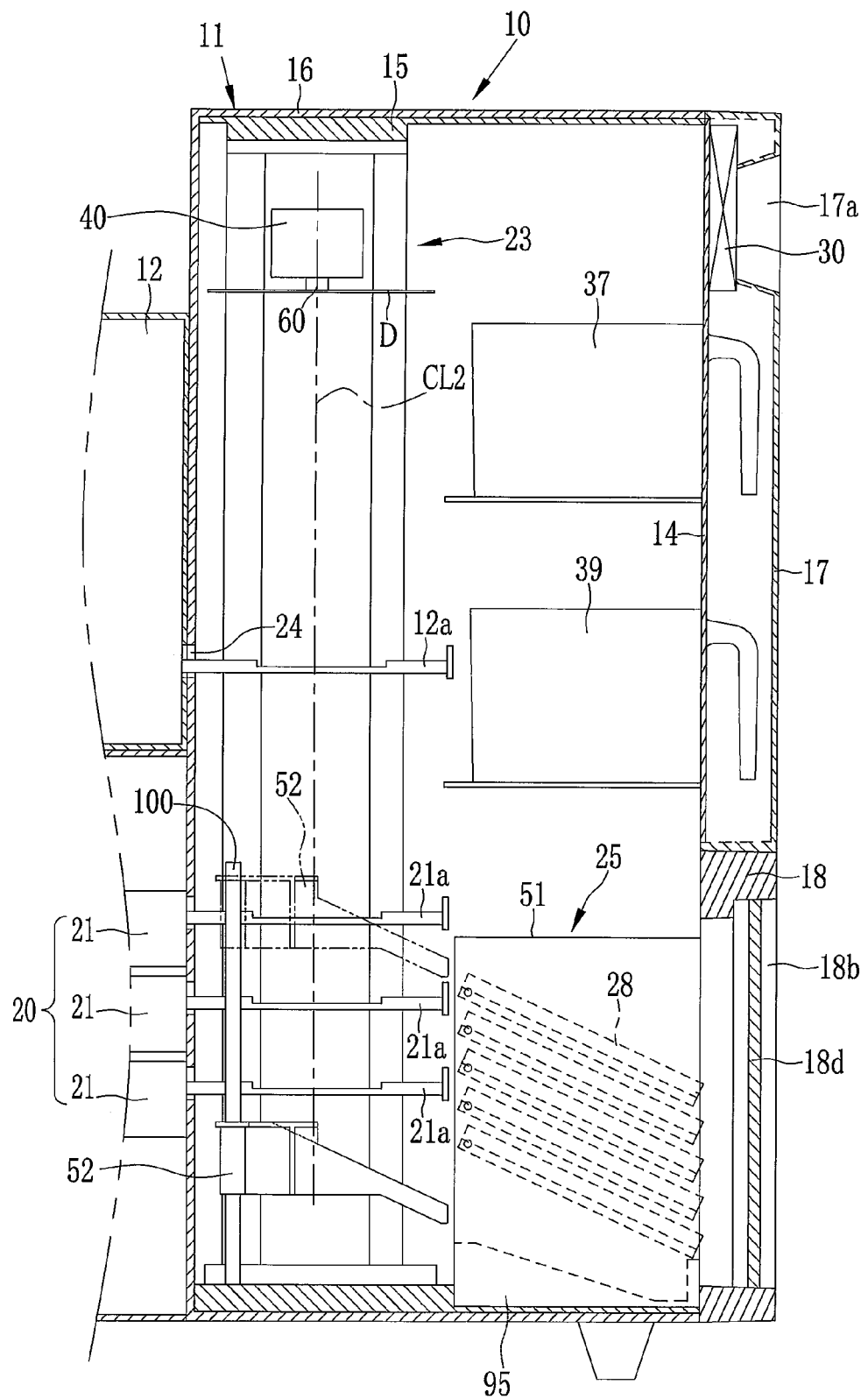
FIG. 3 is a vertical section illustrating the disk processor of which a casing is eliminated.

In FIG. 3, the apparatus body 11 contains a data writer 20 as a disk processing unit, a disk moving assembly 23, a disk sorter 25, and a controller 27 for control of those various elements. A tray opening 24 is formed in a rear wall of the casing 16. A tray 12a of the label printer 12 moves in and out through the tray opening 24. The tray 12a of the label printer 12 horizontally protrudes into the apparatus body 11 through the tray opening 24, and receives the disk D after data writing.

The label printer 12 is constituted by a thermal transfer type of printer or the like known in the art. The tray 12a on the front side is opened and closed horizontally, and when in the open position, is supplied with a disk D, and then shifted to the closed position. The disk D is loaded in the label printer 12 for label printing of an image on a labeling surface, such as a low-resolution image, logo, pattern, and the like. After the label printing, the tray 12a moves to the open position for allowing takeout of the disk D as a printed article.

The data writer 20 is constituted by a plurality of DVD write heads 21 for applying laser light to a recording surface of a disk D to write data as well-known in the art. A tray 21a is disposed in each front side of the DVD write heads 21, is shifted horizontally for opening and closing. An unprocessed disk D is placed on the tray 21a in an open position before the tray 21a is shifted to a closed position. The unprocessed disk D becomes positioned at one of the DVD write heads 21 and ready for data writing. Upon terminating the data writing, the tray 21a moves to the open position to enable takeout of the disk D. Note that the data writer 20 may contain CD write heads.

In general, time of data writing of the data writer 20 for one disk is considerably longer than time of label printing of the label printer 12 for one disk. In view of this, the DVD write heads 21 are three even for the single label printer, to raise efficiency by simultaneous data writing.

Figure 12:
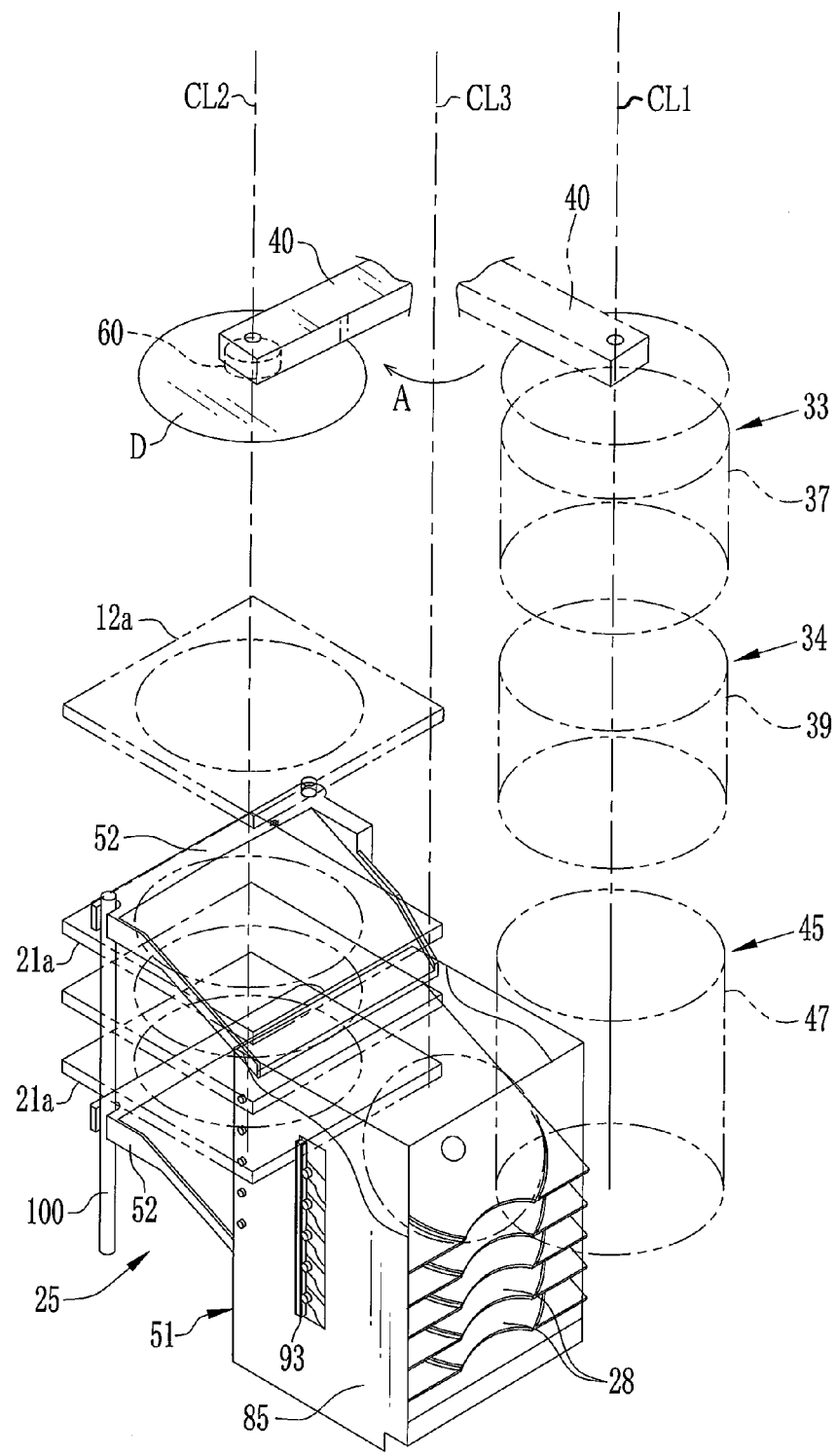
FIG. 12 is a perspective view illustrating a disk moving assembly.

In FIG. 3, when the trays 12a and 21a of the label printer 12 and the DVD write heads 21 are set in the open position, a center point of a disk D on the tray 12a and a center point of a disk D on the tray 21a are positioned on the vertical line CL2 or chute position (See FIG. 12).

In FIG. 1, an opening 17a is formed in an upper portion of the upper panel 17. An input panel 30 of FIG. 2 is disposed in the opening 17a. In FIG. 2, an intermediate panel 14 is secured to the frame 15. Openings 14a, 14b, 14c and 14d are formed in the intermediate panel 14. The opening 14a is positioned to correspond to the opening 17a of the upper panel 17. The input panel 30 is fitted in the opening 14a. A connector (not shown) is disposed on a rear wall of the apparatus body 11. The connector is connectable with a LAN cable or other cable, and transmits data to the controller 27, the data including data from the personal computer (PC), data for label printing, and the like. Various switches are included in the input panel 30, such as a power switch, power source lamp and the like for plural purposes. A display window is disposed in the input panel 30 for displaying a condition of processing in the processor.

Transparent windows 17b and 17c are formed in the upper panel 17. In FIG. 2, the openings 14b and 14c are formed in a portion of the intermediate panel 14 on a right side, and correspond to respectively the transparent windows 17b and 17c. A first disk storage unit 33 and a second disk storage unit 34 are arranged in the openings 14b and 14c in a form of two tiers. The opening 14d is openable for the purpose of maintenance.

The first disk storage unit 33 contains unprocessed DVD disks before data writing or printing, and includes a receiving chamber 36 and a first disk stacker 37. The receiving chamber 36 is formed with the frame 15. The first disk stacker 37 is contained in the receiving chamber 36 in a manner movable out. The first disk stacker 37 is a case having an open end at its top. A grip 37a is formed with the first disk stacker 37 for use in moving a disk into and out of the receiving chamber 36. Plural unprocessed disks D, for example 50, are stacked and contained in the first disk stacker 37. In the embodiment, a DVD disk is used. However, a CD or other disks of any of various formats may be used. The second disk storage unit 34 is constructed similarly to the first disk storage unit 33, and includes a receiving chamber 38 and a second disk stacker 39.

Openings are formed in rear portions of the first and second disk stackers 37 and 39 for removing disks. An actuator access opening is formed in lower portions of the first and second disk stackers 37 and 39. Absence sensors 33b and 34b are fitted in the first and second disk storage units 33 and 34 (See FIG. 4) in a state of containing the first and second disk stackers 37 and 39 on the first and second disk storage units 33 and 34. The absence sensors 33b and 34b, which are used through the actuator access opening, detect absence of unprocessed disks, to input signals to the controller 27. Note that examples of the absence sensors 33b and 34b may be a mechanical type including an actuator, an optical type including a photo sensor, and others. Also, a disk transfer device 40 or disk carrier in an arm form in the disk moving assembly 23 may be provided with an absence sensor including an actuator, instead of the absence sensors 33b and 34b in the first and second disk storage units 33 and 34. This actuator on the disk transfer device 40 enters the actuator access opening in the bottom of the first and second disk stackers 37 and 39. If the actuator does not operate, absence of unprocessed disks can be detected. There is a hold detector 64 (to be described later) which has a detection lever 65. It is possible for the actuator access opening to receive entry of a lever end 65a of the detection lever 65. If no hold signal of a disk is obtained due to failure of upward rotation of the detection lever 65, absence of unprocessed disks can be detected.

In FIG. 1, openings 18a, 18b and 18c are formed in the lower panel 18. The opening 18a is located in the lower panel 18 on the right side. In FIG. 2, a third disk storage unit 45 or processed disk storage unit is disposed in the frame 15 and positioned at the opening 18a. The third disk storage unit 45 has a receiving chamber 46 and a third disk stacker 47 contained in the receiving chamber 46.

Figure 5:
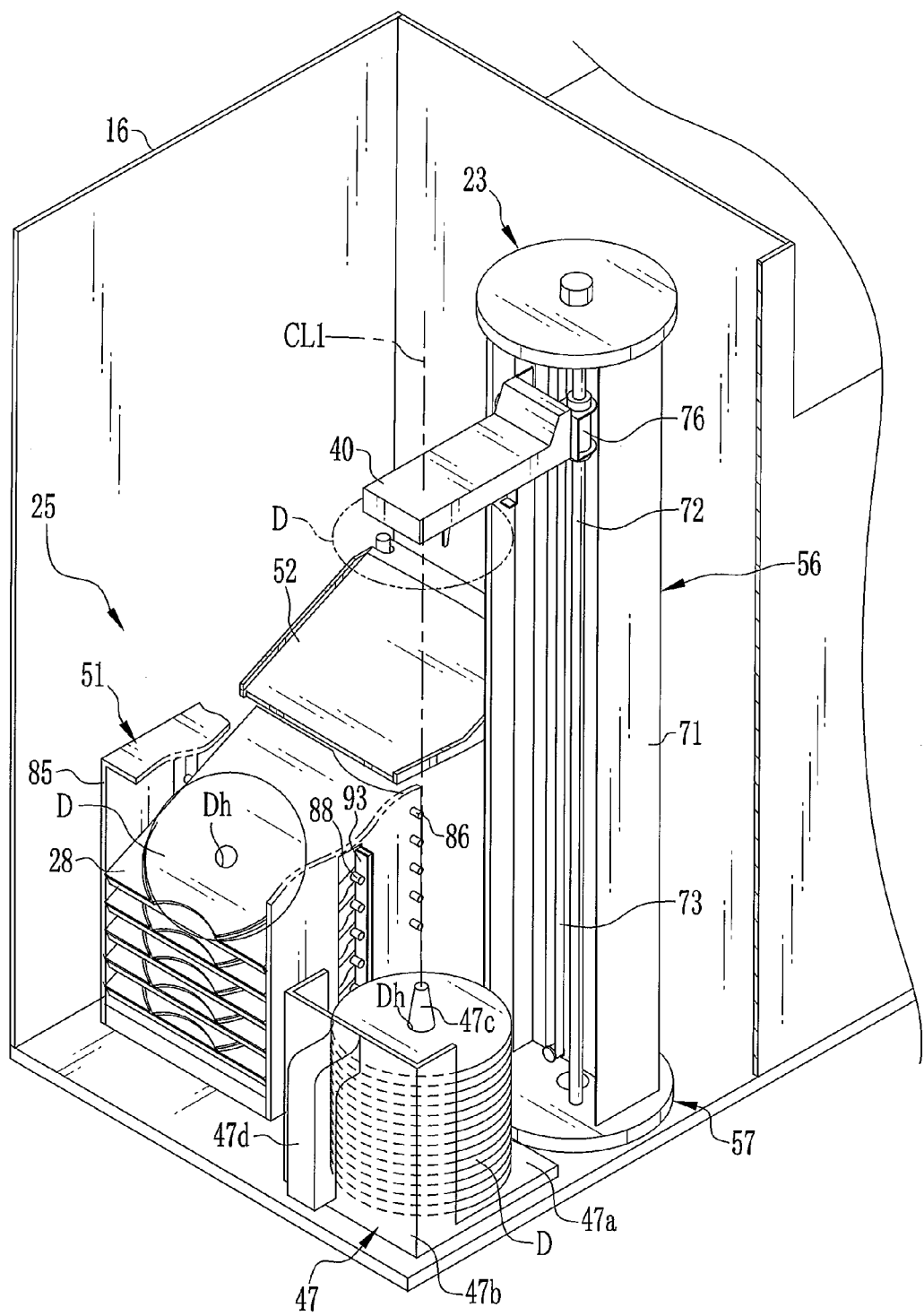
FIG. 5 is a perspective view illustrating a relationship between a disk moving assembly, a sorter and a third disk stacker.

In FIG. 5, a stack of processed disks D are contained in the third disk stacker 47. The third disk stacker 47 includes a lower wall 47a, a front wall 47b and a guide rod 47c. The guide rod 47c is disposed on a center of the lower wall 47a and extends vertically. The guide rod 47c is so long as to receive 100 disks D by entry of its rod portion in the center hole Dh. The lower wall 47a and the front wall 47b are formed from transparent plastic material, through which the stacked disks D are externally visible. The front wall 47b is positioned to cover the opening 18a when the third disk stacker 47 is entered in the receiving chamber 46. A grip 47d is formed with the front wall 47b.

Figure 4:
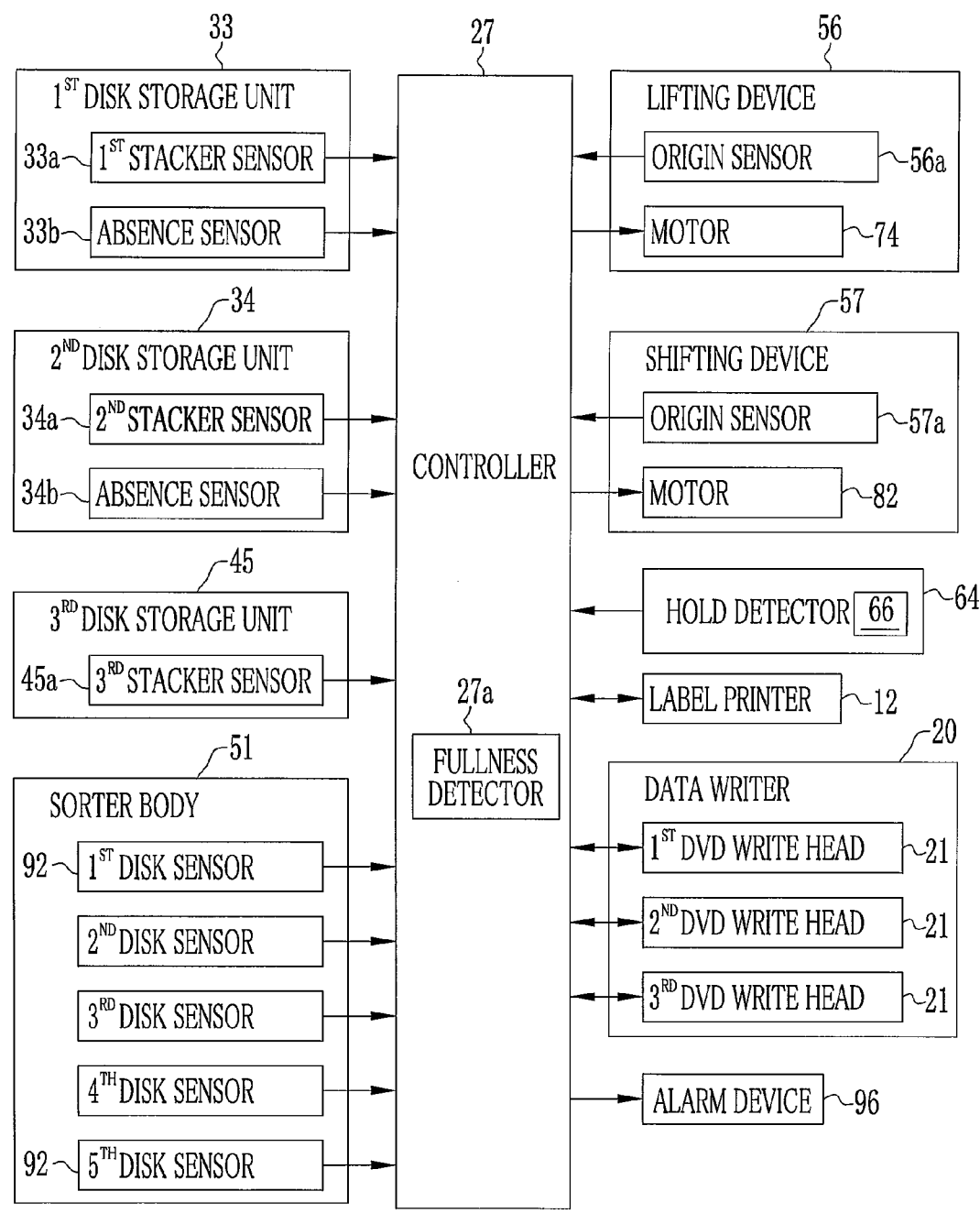
FIG. 4 is a block diagram schematically illustrating circuit elements of the disk processor.

A first stacker sensor 33a of FIG. 4 is attached in the first disk storage unit 33 and checks whether the first disk stacker 37 is set inside the receiving chamber 36. Similarly, a second stacker sensor 34a and a third stacker sensor 45a are attached in the second and third disk storage units 34 and 45, and check whether respectively the second and third disk stackers 39 and 47 are set inside the receiving chambers 38 and 46. Signals from the stacker sensors 33a, 34a and 45a are input to the controller 27. Note that the stacker sensors 33a and 34a can be omitted. This is because it is possible to detect absence of disks by the absence sensors even when the first and second disk stackers 37 and 39 are not set.

In FIG. 1, the opening 18b is formed in a portion on the left of the opening 18a. In FIG. 2, the disk sorter 25 is secured to the frame 15 in a position of the opening 18b. Each of sorting trays 28 appears through the opening 18b. In FIG. 3, the disk sorter 25 includes a sorter body 51 or tray tower, a movable chute structure 52 or ramp structure, and a retaining assembly 53 (See FIG. 18). A pair of openable doors 18d of a type of a double swinging door are secured to the opening 18b, and are opened to take out the disk D through the sorting trays 28 for use.

The opening 18c is formed on the left side of the opening 18b and extends vertically. In FIG. 2, a DVD player/recorder 26 of the disk processor 10 is secured to the frame 15 and positioned at the opening 18c. A tray 26a is movable into and out of the opening 18c.

Figure 6:
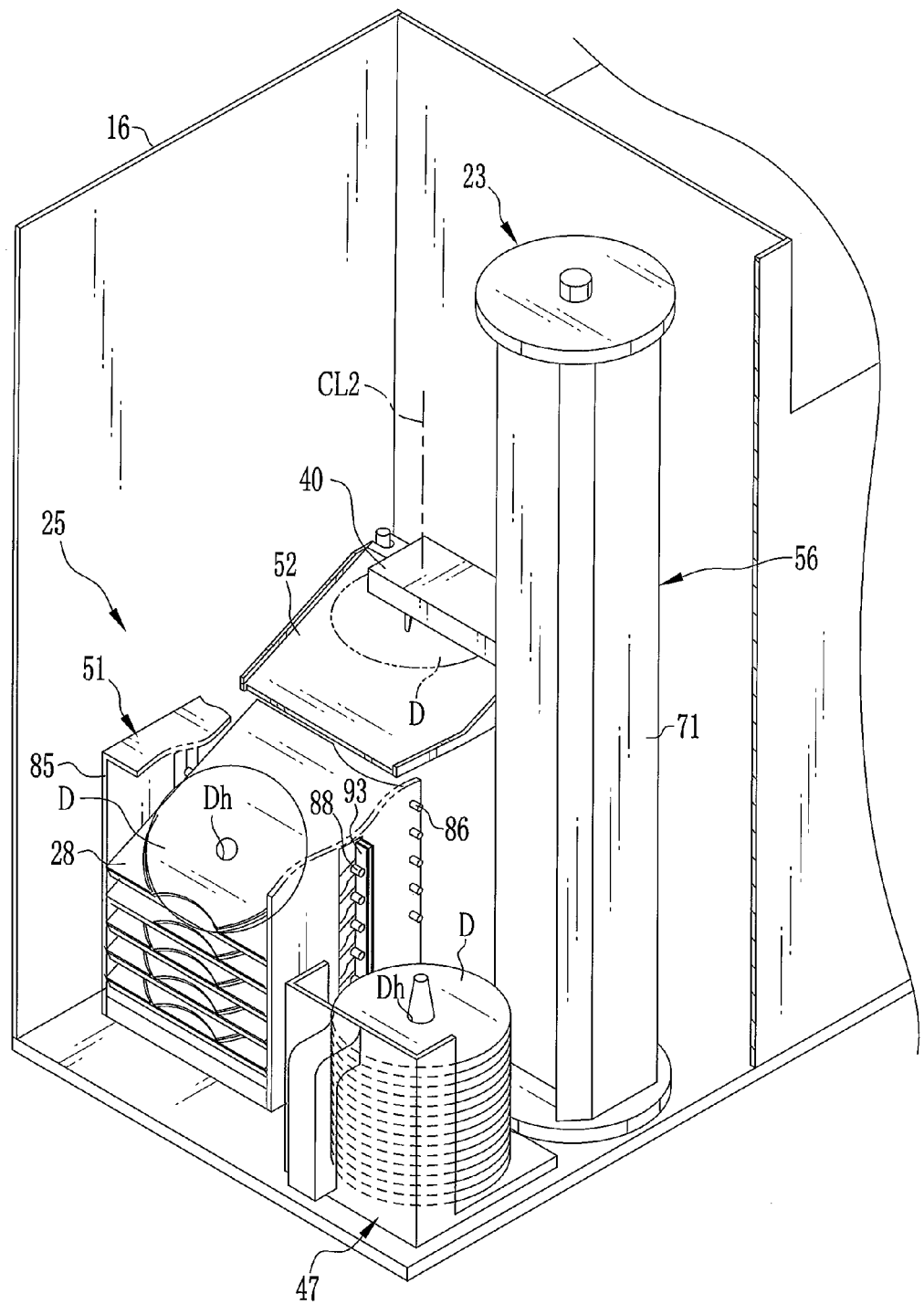
FIG. 6 is a perspective view illustrating the same as FIG. 5 but in which a disk transfer device operates for discharge.
Figure 7:
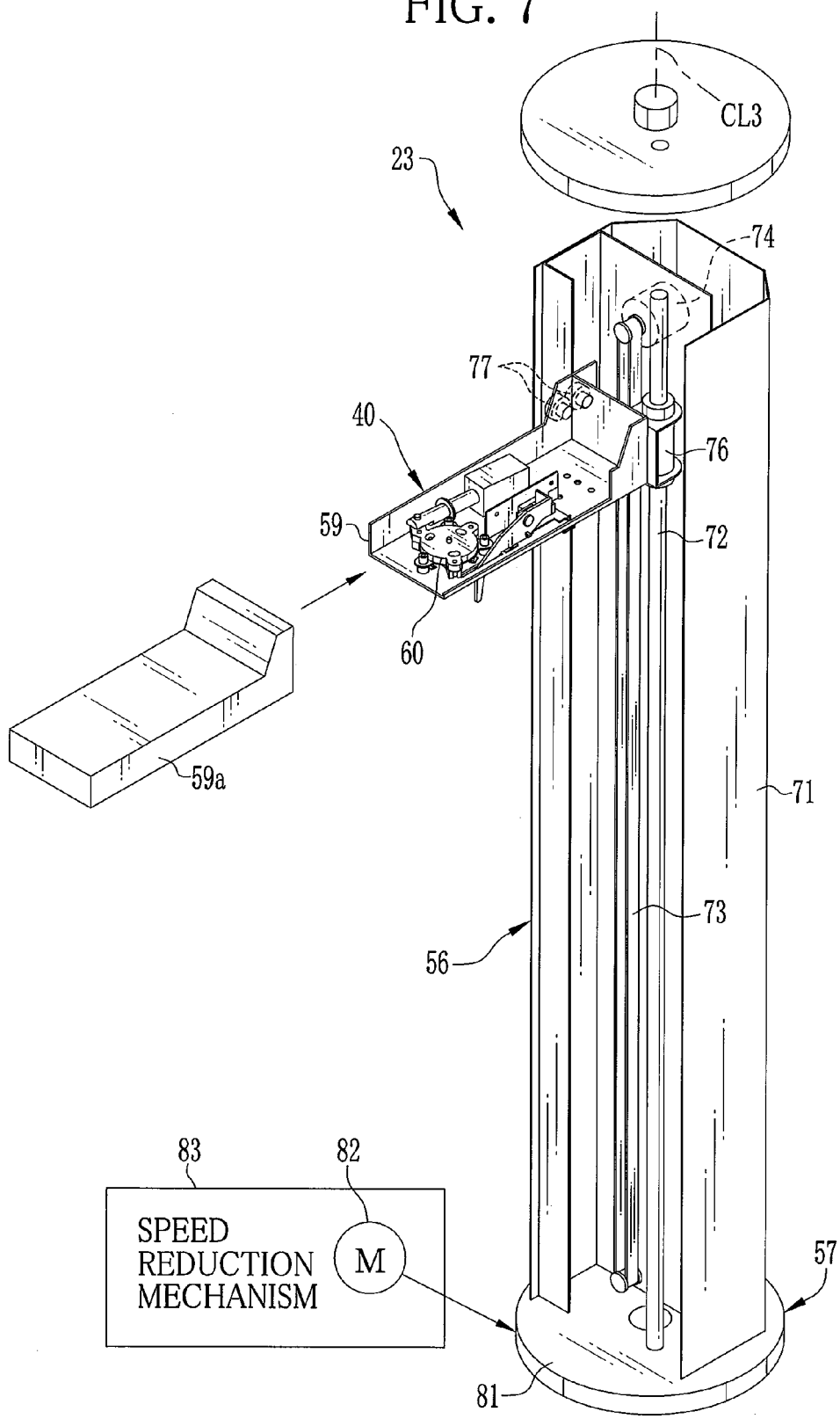
FIG. 7 is a perspective view illustrating the disk moving assembly.

In FIGS. 5, 6 and 7, the disk moving assembly 23 includes the disk transfer device 40, a lifting device 56 and a shifting device 57 or rotating device. The lifting device 56 moves up and down the disk transfer device 40. The shifting device 57 rotates the lifting device 56 in an angular range of, for example, 90 degrees.

In FIG. 7, the disk transfer device 40 includes a carriage 59, an arm cover 59a, and a holding chuck 60. The carriage 59 has a U shape as viewed in a cross section. The arm cover 59a covers the top of the carriage 59. The holding chuck 60 is disposed at an end of the carriage 59. In FIGS. 8-11, the holding chuck 60 includes coupling hooks 61a, 61b and 61c, a closing mechanism 62 and a solenoid 63. The closing mechanism 62 opens and closes the coupling hooks 61a-61c. The solenoid 63 drives the closing mechanism 62. The closing mechanism 62 is shifted by turning on and off of the solenoid 63.

Figure 10:
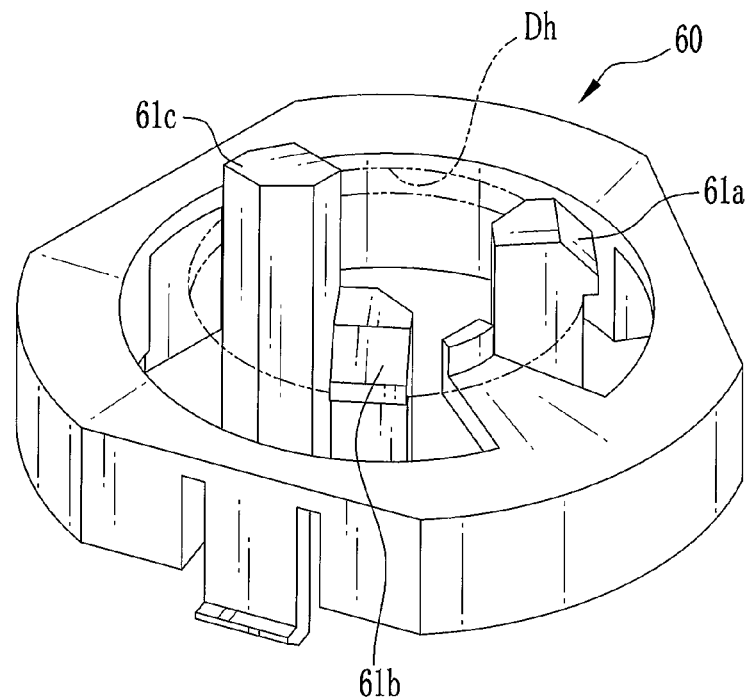
FIG. 10 is a perspective view illustrating a holding chuck in the state of holding.
Figure 11:
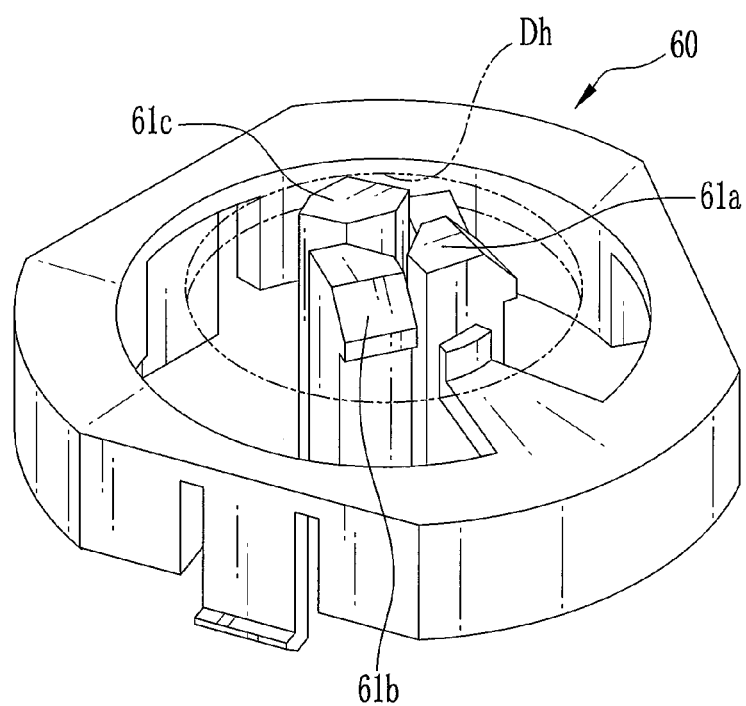
FIG. 11 is a perspective view illustrating the holding chuck in the state of release.

In FIG. 10, the coupling hooks 61a-61c, positioned for holding a disk, come to open externally in radial directions while inserted in a center hole of the disk Dh, and hold the disk. In FIG. 11, the coupling hooks 61a-61c, positioned for starting holding a disk D or for releasing the disk D, become closed to points which are arranged concentrically. The disk is released from the retention, and drops from the disk transfer device 40 downwards.

Figure 8:
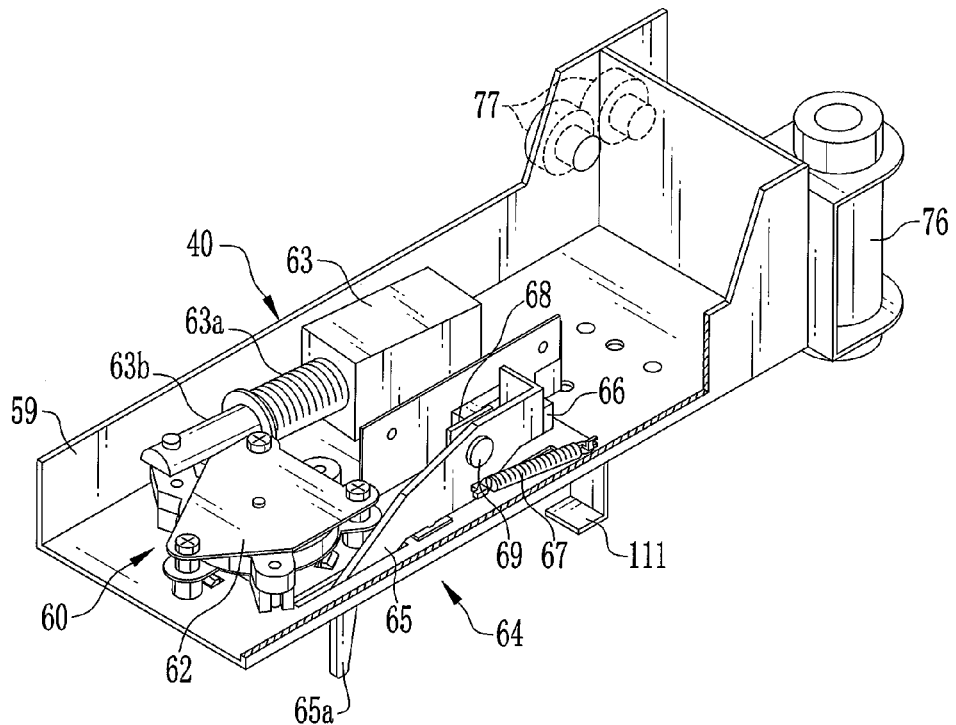
FIG. 8 is a perspective view illustrating the inside of the disk transfer device.
Figure 9:
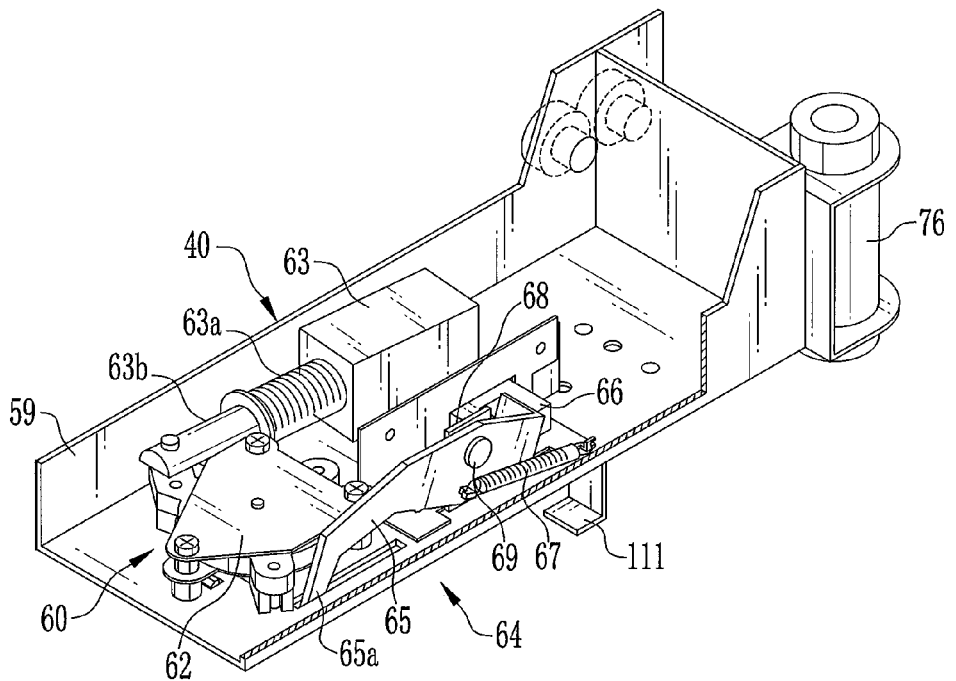

In FIGS. 8 and 9, the hold detector 64 is disposed on the carriage 59 in addition to the holding chuck 60 and the solenoid 63. The hold detector 64 includes the detection lever 65, a photo sensor 66, and a tension coil spring 67. The photo sensor 66 is turned on and off by shift of the detection lever 65. The detection lever 65 has the lever end 65a projecting from a lower surface of the carriage 59. There are a bracket 68 and a pivot 69 with which the detection lever 65 is secured to the carriage 59 in a pivotally movable manner. The tension coil spring 67 biases the detection lever 65 to direct the lever end 65a downwards.

When the holding chuck 60 holds the disk D, the lever end 65a contacts a surface of the disk. See FIG. 9. The detection lever 65 rotates upwards. This rotational shift is detected by the photo sensor 66, which inputs a hold signal of the disk to the controller 27. An example of the photo sensor 66 is a photo interrupter, for example a transmission type.

In FIG. 7, the lifting device 56 includes a frame 71, a rail rod 72 for guiding as rail portion, an endless belt 73, and a stepping motor 74. The frame 71 and the rail rod 72 extend vertically. The endless belt 73 extends vertically and is supported on the frame 71. There are a guide sleeve 76 or carriage sleeve and a guide roller 77 with which the disk transfer device 40 is secured to the rail rod 72 and the frame 71 in a manner movable up and down. The endless belt 73 is turned for circulation back and forth by the stepping motor 74. The disk transfer device 40 is secured firmly to the endless belt 73. When the stepping motor 74 rotates forwards, the disk transfer device 40 moves up. When the stepping motor 74 rotates backwards, the disk transfer device 40 moves down.

In FIG. 4, an origin sensor 56a is disposed on the lifting device 56 for detecting a vertical position of the disk transfer device 40. The number of pulses of the stepping motor 74 is controlled by referring to an original position generated by the origin sensor 56a. The disk transfer device 40 can be stopped in any desired vertical position. Note that plural sensors can be disposed in vertical positions for stopping the disk transfer device 40 in each of the positions in place of using the pulse number for control of the vertical positioning.

In FIG. 7, the shifting device 57 rotationally shifts the disk transfer device 40 and the lifting device 56 about the vertical line CL3 (See FIG. 12) in a limited angular range, for example 90 degrees. The shifting device 57 includes a rotary support 81, a stepping motor 82 and a speed reduction mechanism 83. The rotary support 81 supports a lowest part of the frame 15. The stepping motor 82 rotates the rotary support 81. An origin sensor 57a is secured to the frame 15, and detects an original position of the rotary support 81. See FIG. 4. The pulse number of the stepping motor 82 is controlled by use of the original position according to an output from the origin sensor 57a, so that the center point of the holding chuck 60 of the disk transfer device 40 is set at a selected one of the lines CL1 and CL2. See FIG. 12. Note that examples of devices for transmitting rotation of the stepping motor 82 to the rotary support 81 are a type driven with a belt, a type driven with gears, and the like.

The vertical line CL1 passes through the center points of the disk stackers 37, 39 and 47. The holding chuck 60 of the disk transfer device 40 is moved up and down along the vertical line CL1 to enable takeout of the disk D from the first and second disk stackers 37 and 39 and stacking of the disk D into the third disk stacker 47.

The line CL2 as chute position extends vertically, and passes the center point of a disk in the tray 12a of the label printer 12, the center point of a disk in the tray 21a of any of the DVD write heads 21, and a disk guide surface of the chute structure 52. The disk transfer device 40 is moved up and down along the line CL2, so that it is possible to transfer disks to and from the trays 12a and 21a and to allow drop of the disks D to the chute structure 52.

Figure 13:
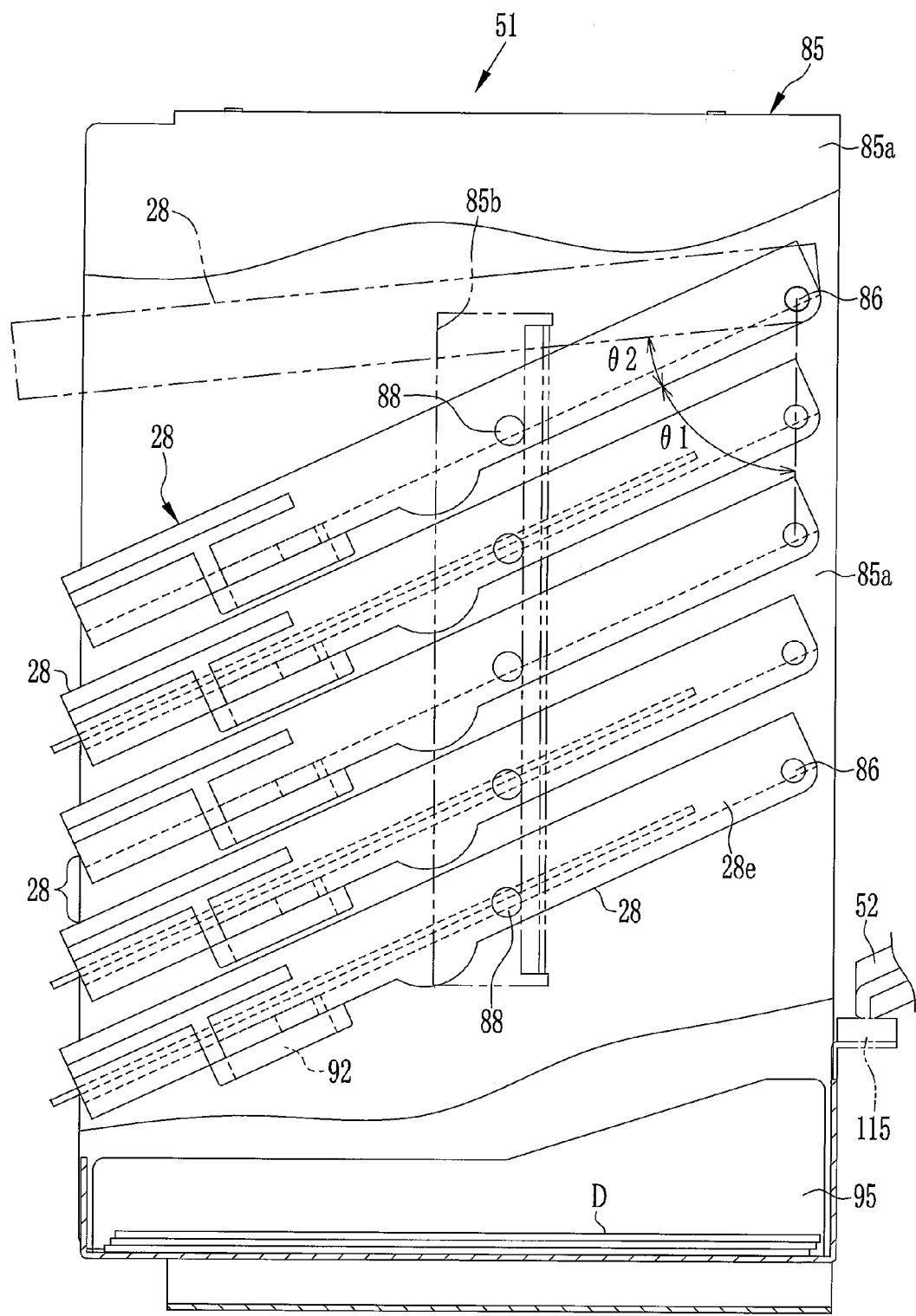
FIG. 13 is an explanatory view illustrating a sorter body.
Figure 14:
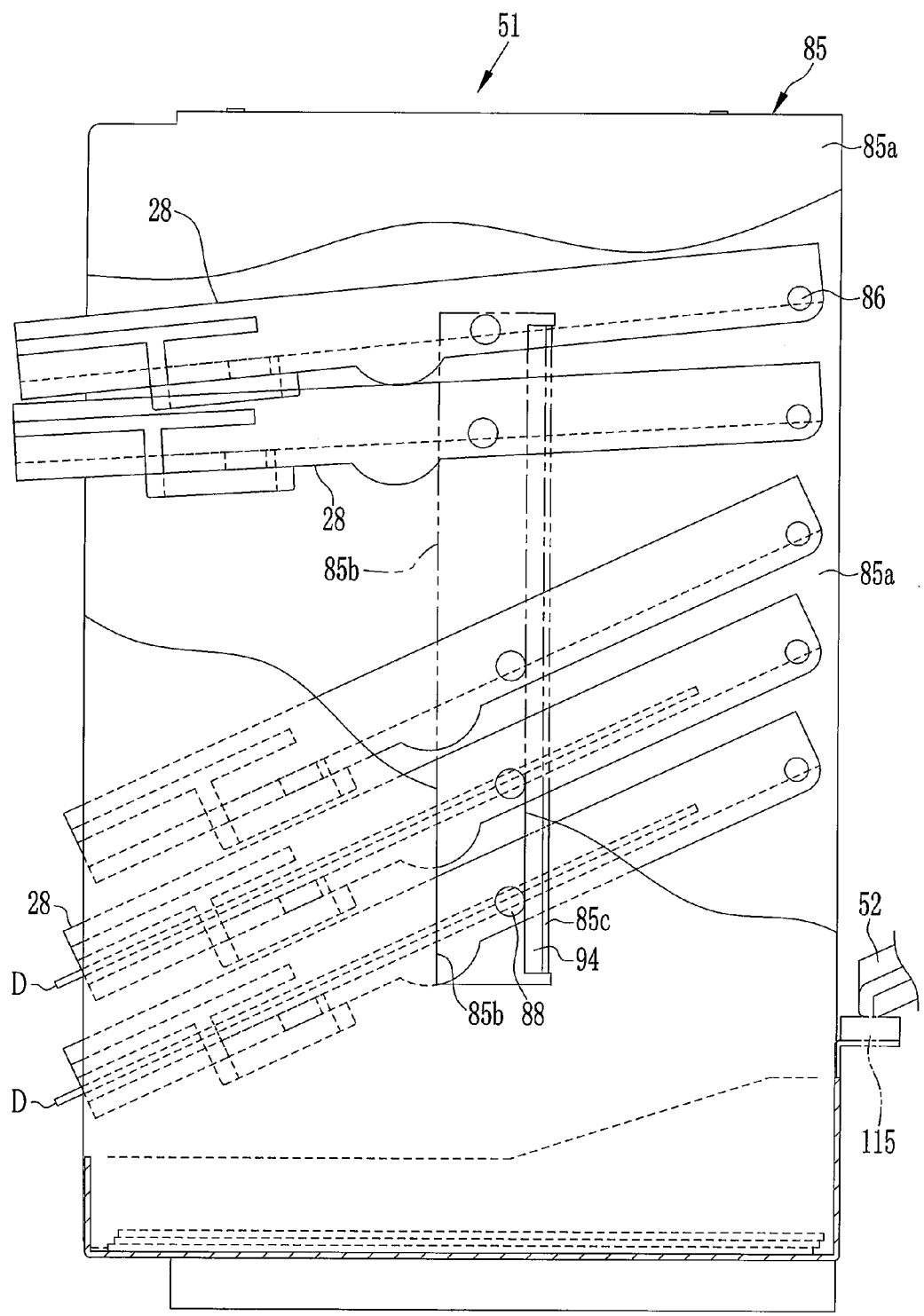
FIG. 14 is an explanatory view illustrating the sorter body in which a sorting tray is partially raised.
Figure 15:
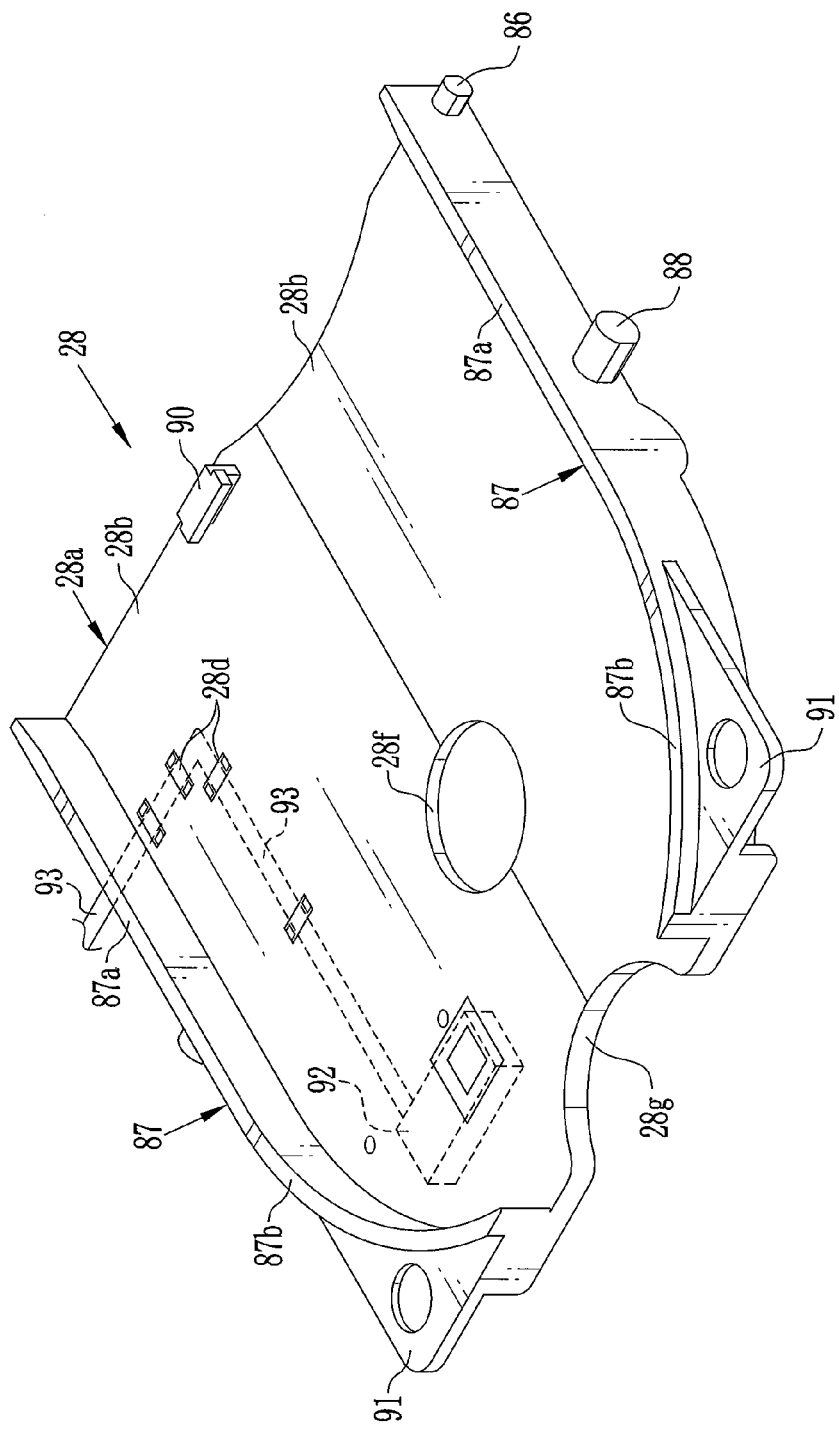
FIG. 15 is a perspective view illustrating the sorting tray.

In FIGS. 13 and 14, the sorter body 51 includes a sorter frame 85 and the five sorting trays 28. The sorter frame 85 has a channel shape as viewed in a cross section. See FIG. 12. The sorting trays 28 are arranged in a multi-level arrangement within the sorter frame 85. A support shaft 86 projects from each rear portion of the sorting trays 28. The sorter frame 85 has lateral plates 85a on which the support shaft 86 supports the sorting trays 28 in a pivotally movable manner. In FIG. 15, a lateral ridge 87a for guiding projects from each of the sorting trays 28. A regulation pin 88 projects at the center of the lateral ridge 87a. A regulation opening 85b is formed in the sorter frame 85, and has an edge which is engaged with the regulation pin 88 and limits a movable range of the sorting trays 28.

In FIG. 13 for the present embodiment, the sorting trays 28 pivotally move between the first inclined position (indicated by the solid line) for disk advance and the second inclined position (indicated by the phantom line) for raising a first one of the sorting trays 28 to take out a disk from a second one of the sorting trays 28 directly under the first. An inclined angle $\theta 1$ of the first inclined position of the sorting trays 28 relative to a vertical direction is in a range of 40-85 degrees, preferably in a range of 50-70 degrees. An opening angle $\theta 2$ is defined by subtracting the inclined angle $\theta 1$ of the first inclined position from an inclined angle of the second inclined position, and in a range of 20-60 degrees, preferably in a range of 30-40 degrees. Note that it is unacceptable to move up the sorting trays 28 over the horizontal line, because the disk D may drop backwards.

In FIG. 15, the sorting trays 28 are quadrilateral. Each of the sorting trays 28 includes a tray plate 28a and an anti-drop guide portion 87 formed with lateral edges of the tray plate 28a. The anti-drop guide portion 87 includes the lateral ridge 87a and a front ridge 87b at a front tray end. The lateral ridge 87a extends along each of lateral edges of the sorting trays 28, and protrudes upwards. The front ridge 87b extends from the lateral ridge 87a, is curved in a manner similar to the round edge of the disk D, and has a range toward the front tray end of the tray plate 28a.

Two parts of disk receiving surfaces 28b at a rear tray end are formed with the tray plate 28a, and have a height increasing respectively toward the lateral edges from a center line with reference to the direction of moving down of the disks. A disk D slips and drops on the disk receiving surfaces 28b. Only edge portions of the disk D contact the disk receiving surfaces 28b. The recording surface of the disk D does not contact the tray plate 28a. The recording surface can be free from being scratched or damaged in the course of drop with slip.

An access hole 28f is formed in a center portion of the tray plate 28a for access of a finger to a center hole of a disk to remove the disk. An access cutout 28g is formed in a front tray end for access of a finger to an edge of the disk. A pair of projections 91 project from corners of the tray plate 28a for raising the sorting tray 28. In FIG. 14, a finger is set on the projections 91. When a second uppermost one of the sorting trays 28 is moved upwards with the finger, a lower space can become so large as to facilitate the takeout of the disk D from a third uppermost one of the sorting trays 28.

In FIG. 15, a stopper 90 is positioned at a rear tray end of the tray plate 28a and projects from the disk receiving surfaces 28b. The stopper 90 is shaped in an L shape as viewed laterally. An upper end of the stopper 90 projects in a forward direction. When the sorting tray 28 is raised, the stopper 90 prevents the disk D from dropping backwards even with an inclination in the backward direction.

In FIGS. 13 and 15, a disk sensor 92 is secured to a lower surface of the sorting tray 28 for detecting a disk contained in the sorting tray 28. Also, brackets 28d are formed with the sorting tray 28. A cable 93 is kept by the brackets 28d on the sorting tray 28 without hanging down, and sends a signal from the disk sensor 92 to the controller 27. The disk sensor 92 generates a detection signal which is checked for preventing unwanted discharge of a second disk D inside the sorting tray 28.

In FIG. 14, a cushioning pad 94 is positioned on edges of the regulation opening 85b of the sorter frame 85 for receiving contact of the regulation pin 88. There is a bracket 85c for attaching the pad 94 in the regulation opening 85b. The pad 94 is formed from such a material as thermoplastic elastomer, rubber or the like or composite material produced from two or more of those, and absorbs shock upon engagement of the regulation pin 88. When the disk is taken out by raising the sorting tray 28, the sorting tray 28 is released from holding. The sorting tray 28 becomes inclined again from the horizontally oriented state. If a disk D remains in the sorting tray 28 in the raised state, shock due to the engagement might cause outward jump of the disk D in the sorting tray 28. However, the pad 94 can operate to avoid such an unwanted phenomenon.

A stationary sorting tray 95 is disposed in the sorter body and under the lowest one of the sorting trays 28. The stationary sorting tray 95 is used for discharging an unacceptable disk D after failure of printing, data writing or the like.

Figure 16:
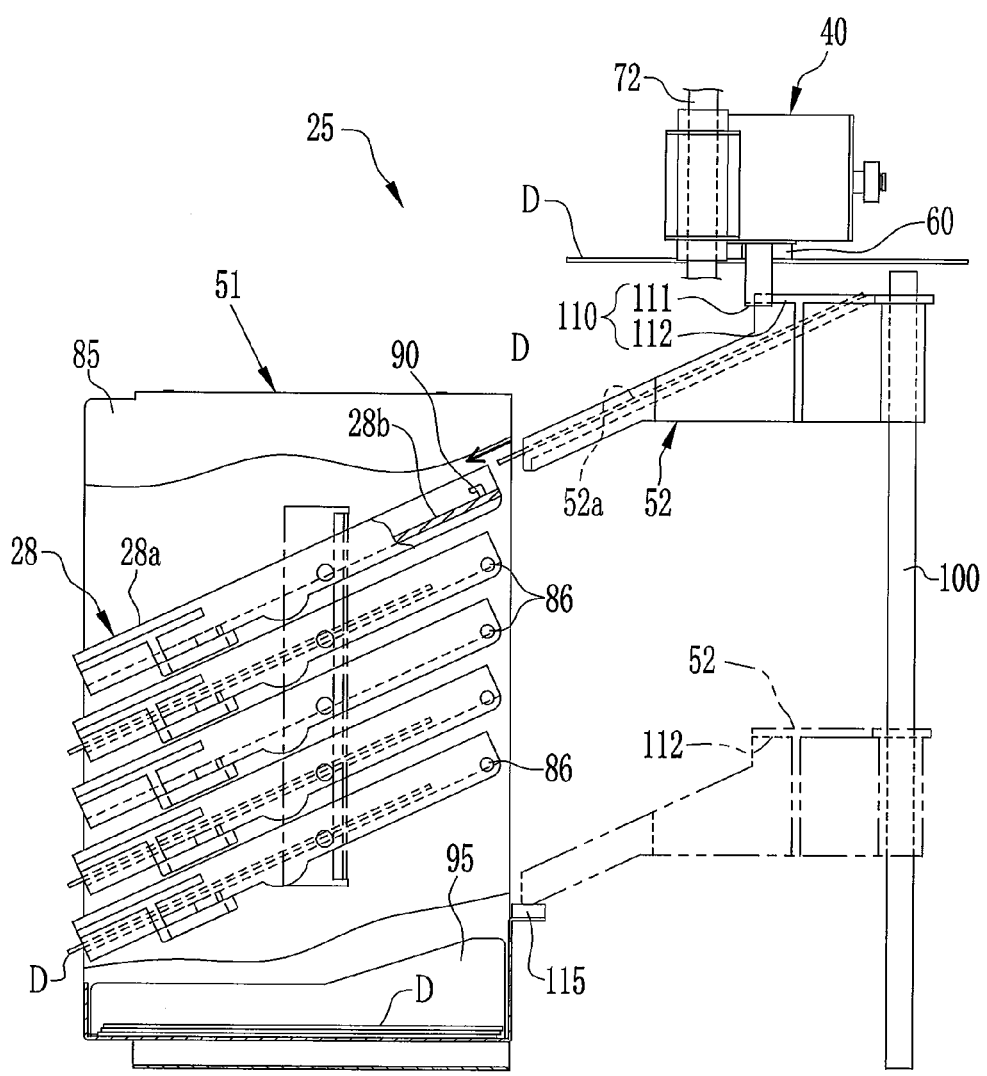
FIG. 16 is a side elevation illustrating a relationship between the sorter body, the chute structure and the disk transfer device.
Figure 17:
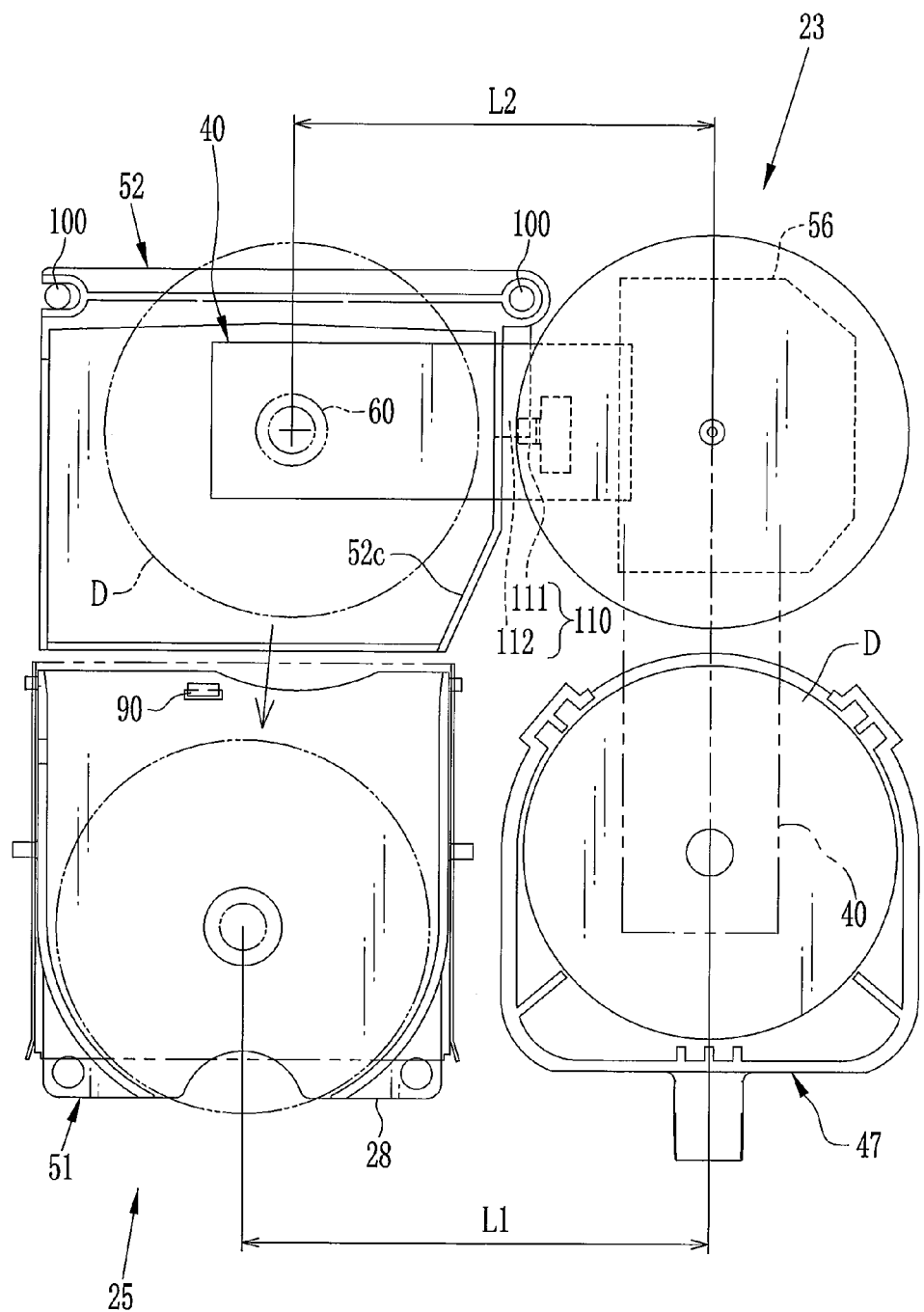
FIG. 17 is an explanatory view in a plan illustrating the retention between the disk transfer device and the chute structure.
Figure 18:
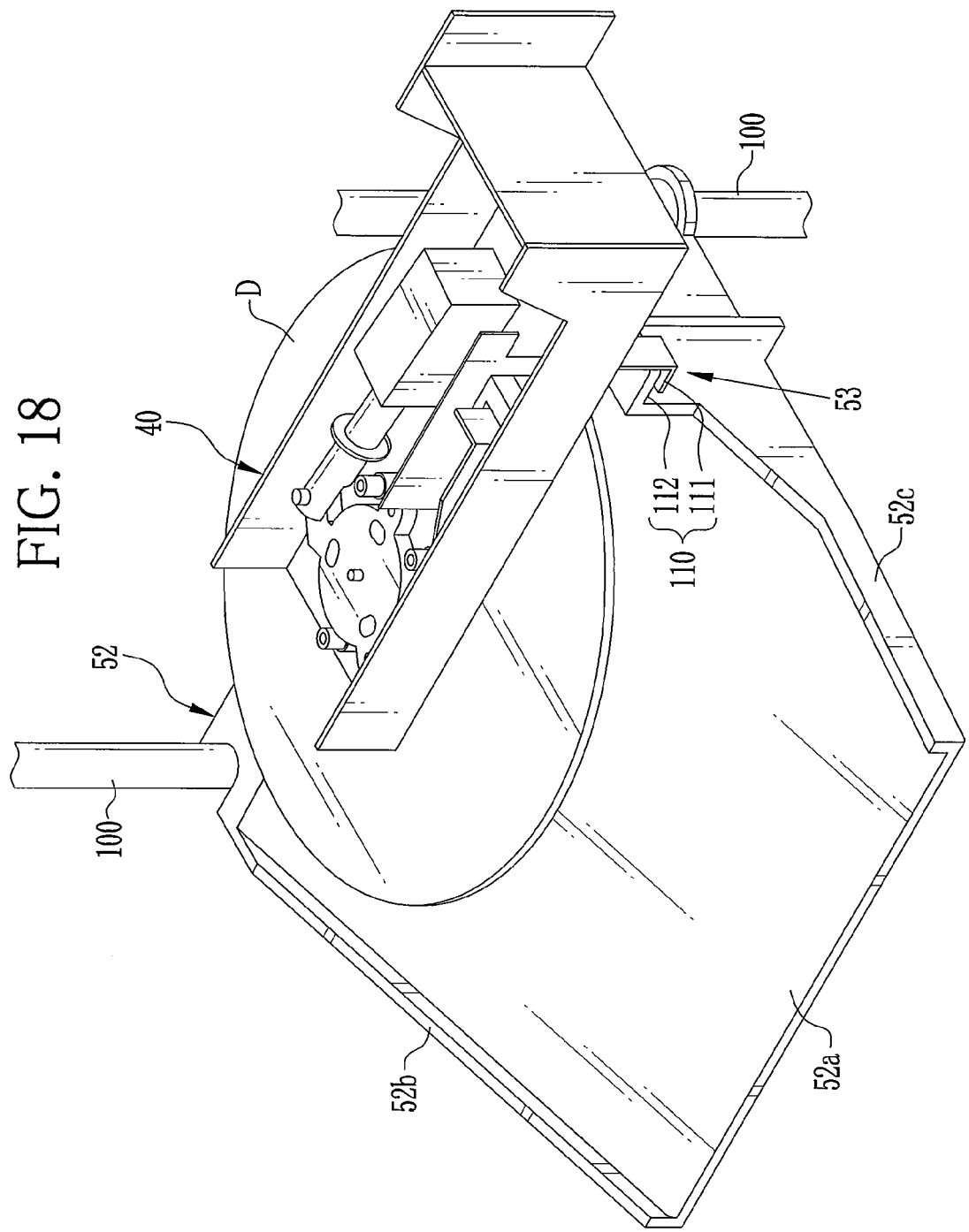
FIG. 18 is a perspective view illustrating the same as FIG. 17.

In FIG. 16, the chute structure 52 is disposed behind the sorter body 51. A pair of guide rods 100 are disposed to keep the chute structure 52 movable up and down. In FIG. 18, a ramp surface 52a is formed on the chute structure 52 with an inclined angle equal to that of the sorting tray 28. Edge guide ridges 52b and 52c project from edge portions of the chute structure 52, and prevent a disk D from dropping laterally. A width of the ramp surface 52a of the chute structure 52 is slightly greater than a width of the sorting tray 28. In FIG. 17, a pitch L1 of the disposition of the disk stackers 37, 39 and 47 and the sorter body 51 or tray tower with reference to the transverse direction is slightly greater than a pitch L2 between the center points of the third stacker and the disk tray of the disk processor (L1>L2). In the chute structure 52, the edge guide ridge 52c on the right side in FIG. 17 is bent at the middle point as viewed in the front-to-back direction so as to set a width of a chute end of the chute structure 52 approximately equal to the width of the sorting tray 28. The chute structure 52 has a gradually decreasing width toward the chute end from the middle point as viewed in the front-to-back direction. The disk D is dropped with slip and with a shift toward the left in FIG. 17 on the edge guide ridge 52c, and can be discharged in the sorting tray 28.

In FIG. 18, the chute structure 52 is associated with the retaining assembly 53. The lifting device 56 drives the chute structure 52 in connection with the disk transfer device 40 for transmission. This enables positioning of the chute structure 52 at one of the sorting trays 28 for disk transfer. The construction can be simple, because no discrete driving mechanisms are required.

In the embodiment, a coupling device 110 is used in the retaining assembly 53. The coupling device 110 includes a retention claw 111 and a claw receiving surface 112. The retention claw 111 is disposed on a lower surface of the disk transfer device 40, and formed in an L shape. The claw receiving surface 112 is disposed on the chute structure 52, and receives the retention claw 111 for retention. In FIGS. 17 and 18, the disk transfer device 40 moves down on the line CL2 as chute position. The retention claw 111 becomes ready for retention on the claw receiving surface 112 when the disk transfer device 40 is slightly higher than the chute structure 52 which is in its initial position (to be described later). In FIG. 16, the retention claw 111 retains the claw receiving surface 112 upon rise of the disk transfer device 40, so that the chute structure 52 can be moved up by the disk transfer device 40.

In FIG. 16, the rise of the disk transfer device 40 stops moving up when a front end of the chute structure 52 is located slightly higher than the rear tray end of one of the sorting trays 28 for ejection. The chute structure 52 can be positioned in the guide position. The chute structure 52 is set in a high position relative to the sorting tray 28 in the guide position so as to prevent contact of the stopper 90 on the sorting tray 28 with the disk D. The disk D can be smoothly moved down from the ramp surface 52a to the sorting tray 28 and stopped by the front ridge 87b without contacting the stopper 90.

After the disk D is released and dropped, the disk transfer device 40 moves down. In response, the chute structure 52 also moves down. A stopper 115 retains the chute structure 52 set in the initial position (indicated by the phantom line in FIG. 16) for dropping the disk D to the stationary sorting tray 95. Then in FIG. 19, the disk transfer device 40 is rotated by the shifting device 57 to the position of disengagement of the coupling device 110. The disk transfer device 40 is moved up by the lifting device 56. As the coupling device 110 is released from engagement, the chute structure 52 does not move up with the disk transfer device 40. The disk transfer device 40 moving up stops in a predetermined position of a medium height in a vertical direction, and stands by for next transfer of a disk.

The operation of the above construction is described. The disk processor 10 is connected with a personal computer. A computer program or software is installed in the computer, and executed to control the disk processor 10 for data writing and label printing. Note that it is possible to install a computer program in the controller 27 for the same control without control by the computer.

At first, an unprocessed disk D is set in the first disk storage unit 33. See FIG. 12. A power source of the disk processor 10 is turned on. The disk transfer device 40 is in a ready position (See FIG. 5) allowing delivery of the disk D from the first disk stacker 37, and positioned on the vertical line CL1. The computer generates a command signal of data writing and label printing. The disk transfer device 40 moves down to support an unprocessed disk D in the first disk stacker 37. The disk transfer device 40 moves up, then rotates in the direction A, and becomes positioned on the line CL2 as chute position. The disk transfer device 40 moves down, and transfers an unprocessed disk D to the tray 21a of one of the DVD write heads 21. Then the tray 21a comes to the closed position. The DVD write head 21 writes data to the disk D. Similarly, each remaining one of the DVD write heads 21 is loaded with an unprocessed disk D in the same steps.

When the DVD write heads 21 terminate the writing operation, the tray 21a moves to the open position. The disk D on the tray 21a is held by the disk transfer device 40, and transferred to the tray 12a of the label printer 12. The tray 12a of the label printer 12 is kept in the closed position free from blocking the disk transfer. The disk D after the data writing passes through the label printer 12, before the tray 12a is shifted to the open position. The tray 12a receives the transfer of the disk D. After the transfer, the tray 12a becomes contained in the body of the label printer 12, where a label is printed on the disk D. The tray 12a comes to the open position after the printing. The disk D becomes held on the disk transfer device 40 in a printed form.

Figure 19:
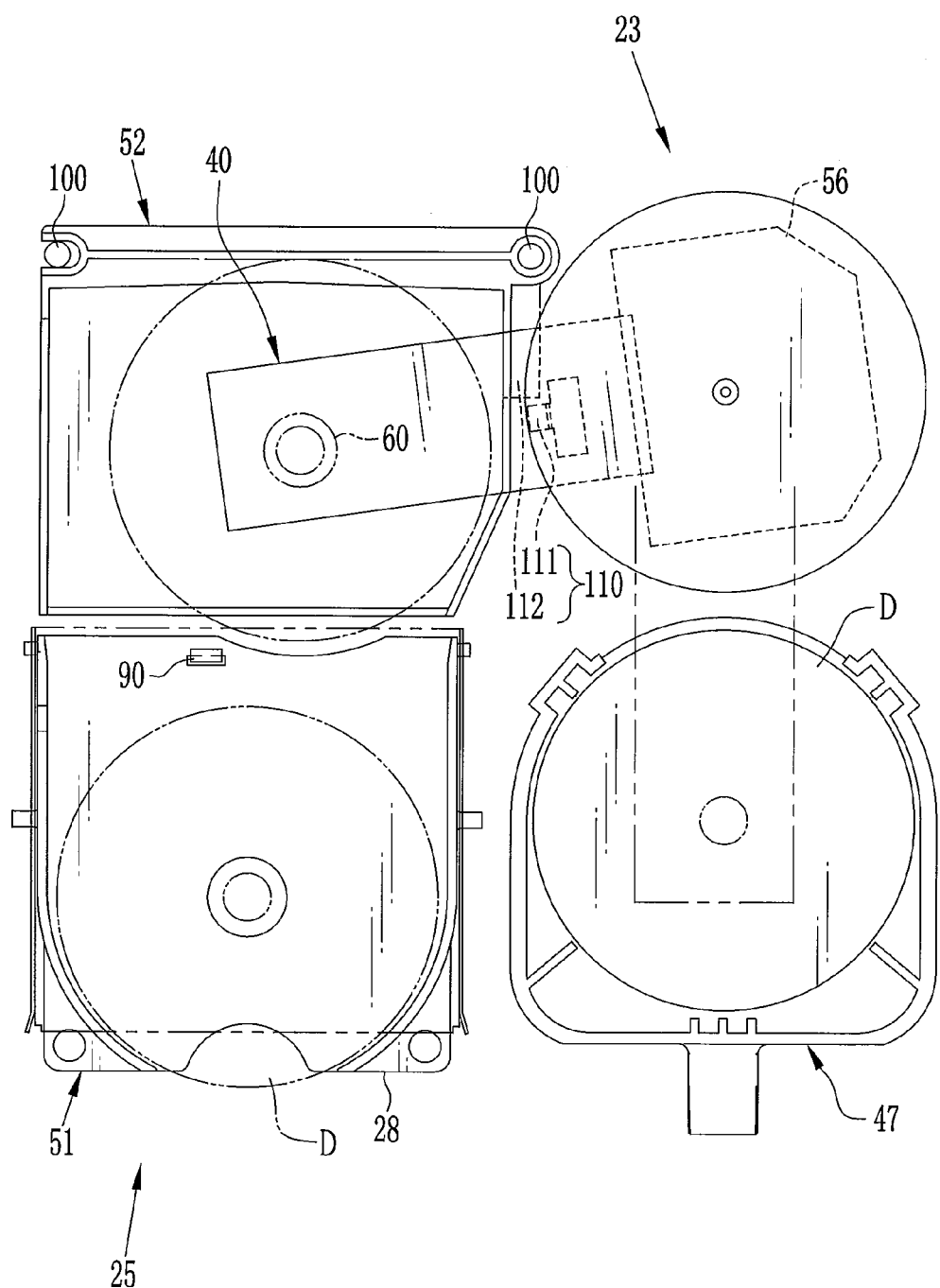
FIG. 19 is an explanatory view in a plan illustrating a state of the disk transfer device in the disengaged position.

Then the disk transfer device 40 moves down. The trays 12a and 21a are in the closed position so as not to block the disk transfer. In FIG. 19, the shifting device 57 rotates the disk transfer device 40 to a disengaged position in the course of moving down. Then the disk transfer device 40 comes near to the chute structure 52 or ramp structure, and upon reach to a position of enabling retention, rotates to its retained position in FIG. 17. The retention claw 111 is ready to retain the claw receiving surface 112. In FIG. 16, the disk transfer device 40 moves up. After the disk transfer device 40 moves up to the guide position of an uppermost one of the sorting trays 28, the disk D is released from the retention. The disk D drops from the disk transfer device 40, and is guided toward an uppermost one of the sorting trays 28 through the chute structure 52. Similarly, processed disks D after the data writing and label printing are discharged in respectively the sorting trays 28.

After the data writing, the data writer 20 is loaded with one unprocessed disk D. The processed disk D is similarly moved to the label printer 12. A label is printed on the disk D, which is discharged in one of the sorting trays 28.

When the processed disk D is discharged in each of the sorting trays 28, an operator opens the openable doors 18d to take out the disk D. In FIG. 14, takeout of the disk D from a third uppermost one of the sorting trays 28 is illustrated. He or she manually raises the projections 91 of a second uppermost one of the sorting trays 28. This creates a large space directly over the third uppermost sorting tray 28. A finger of the operator can access and take out the disk D easily.

A first or second uppermost one of the sorting trays 28 is in the upward position by manual operation. If the first or second uppermost one of the sorting trays 28 is empty of the disk D, it is likely that the first or second uppermost one of the sorting trays 28 receives a succeeding processed disk D upon discharge. In the embodiment, the sorting tray 28 is kept from swinging further than the horizontal line by the regulation opening 85b even in the upward position. The transferred disk D can be contained even if the first or second uppermost one of the sorting trays 28 are in the upward position.

Also, there is an alarm device 96 operated when all the disks D are transferred into the sorting trays 28 or when only one of the sorting trays 28 remains empty. The alarm device 96 generates an alarm sound or the like to inform an operator of necessity of disk removal. Note that it is possible instead of or additionally to the alarm to transfer processed disks D into the third disk stacker 47 after transfer of the disks D to all of the sorting trays 28. Also, processed disks D can be stacked in the third disk stacker 47 without use of the sorting trays 28. To this end, one of preset operation modes is selected for generating a mode signal.

When all the unprocessed disks D are moved out of the first disk stacker 37, the absence sensor 33b generates a detection signal. In response to this, unprocessed disks D are supplied from the second disk stacker 39. An alarm signal is generated by the alarm device 96 as the first disk stacker 37 has become empty. An operator replenishes the first disk stacker 37 with additional unprocessed disks D. The disk processing can be carried out continuously.

Should failure occur, such as failure in the data writing or printing, then a failing disk D is discharged in the stationary sorting tray 95 in the lowest position without transfer into the sorting trays 28. This is for preventing mistaking the failing disk for a processed disk.

When the number of the disks D in the third disk stacker 47 after processing comes up to 100 as a predetermined number, then fullness is detected according to a detection signal of the hold detector 64 in the disk transfer device 40. To this end, a fullness detector 27a is incorporated in the controller 27. The fullness detector 27a detects the fullness if the hold detector 64 continues to generate the hold signal even upon rise of the disk transfer device 40 at an amount of one disk after release of the disk with the disk transfer device 40. When the fullness is detected, an alarm signal is generated by the alarm device 96. Also, the disk transfer is interrupted upon termination of the disk processing. With the generation of the alarm signal, an operator removes the third disk stacker 47 from the third disk storage unit 45. An empty third disk stacker 47 is newly set in the third disk storage unit 45. After this, driving is restarted upon inputting a signal for commanding a restart. Note that the driving may be restarted automatically without the command signal.

In the above embodiment, stacked disks are CDs or DVDs. However, stacked disks according to the invention may be any type of disks or objects with a small thickness in a circular shape. The construction for disk sorting of the invention can be used in a disk dispenser, disk collating apparatus, disk distributor or various other apparatuses for disk handling.

In the above embodiment, the ramp surface 52a of the chute structure 52 is flat in FIG. 18. Alternatively, a pair of ramp surfaces can be formed with the chute structure 52, the surfaces having a height increasing respectively toward lateral edge lines from a center line with reference to the direction of moving down of the disks. The ramp surfaces may be in a V form of a small gradient, an arcuate form or other forms, which will cause an easily slipping property owing to reduction of an area of contact with a disk. The recording surface can be free from being scratched or damaged, because of no direct contact with the ramp surface.

In FIG. 19, the claw receiving surface 112 is disengaged from the retention claw 111 in the coupling device 110 by rotating the disk transfer device 40. However, a coupling device may be constructed differently, for example, for disengagement by moving up or down. In FIGS. 20-23, another preferred coupling device 122 is illustrated, and includes a retention lever 120 and a release lever 121.

The retention lever 120 includes a lever portion 120a, a link portion 120b and a retention claw 120c, and is shaped in a channel form as viewed in a cross section. An extension 120d is formed to extend from the link portion 120b. There is a pivot 123 about which the retention lever 120 is movable on the disk transfer device 40 pivotally.

There is a pivot 125 about which the release lever 121 is pivotally movable on the frame 15 in the vicinity of an upper end of the guide rods 100 of the chute structure 52. A regulation slot 126 of an arcuate form is formed through the release lever 121. Guide pins 127 and 128 are inserted in the regulation slot 126, and rotationally shift between a first position defined in a counterclockwise direction and a second position defined in a clockwise direction. The second position is used for disengagement. A release pin 130 protrudes from the release lever 121 horizontally and comes into a path where the lever portion 120a of the retention lever 120 passes when the disk transfer device 40 moves up or down. A tension coil spring 132 biases the release lever 121 toward the second position.

The chute structure 52 has a claw receiving surface 135. An inclined guide surface 136 is disposed with the claw receiving surface 135, and is run over when the retention claw 120c of the retention lever 120 moves down so as to retain the retention claw 120c on the claw receiving surface 135.

A sequence of steps for the retention of the embodiment is described now. When the disk transfer device 40 moves down, the retention claw 120c of the retention lever 120 contacts the inclined guide surface 136 of the chute structure 52, runs over the inclined guide surface 136, and becomes retained on the claw receiving surface 135 in a retained position. The disk transfer device 40 moves up. The chute structure 52 also moves up together with the disk transfer device 40 owing to the retention between the retention claw 120c and the claw receiving surface 135. The chute structure 52, when positioned at a designated one of the sorting trays 28 as guide position, stops moving up. A disk D is dropped and can be transferred into the sorting trays 28.

Figure 22:
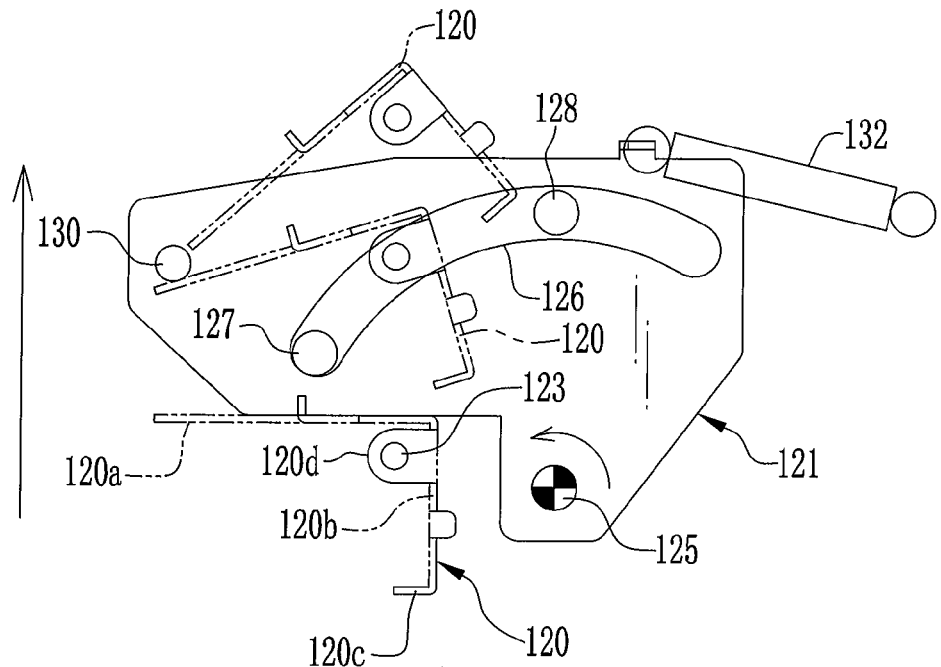
FIG. 22 is an explanatory view illustrating a state of a retention lever in the course of moving up of the disk transfer device.

Then the disk transfer device 40 is moved up to an upper end position higher than a guide range of the guide rods 100. In FIG. 22, the lever portion 120a contacts and is pushed by the release pin 130 of the release lever 121. The retention lever 120 rotates counterclockwise to disengage the retention claw 120c from the claw receiving surface 135 of the chute structure 52. Thus, the chute structure 52 is moved down by its weight because of disconnection from the disk transfer device 40, and returns to its initial position or lower end position.

Figure 20:
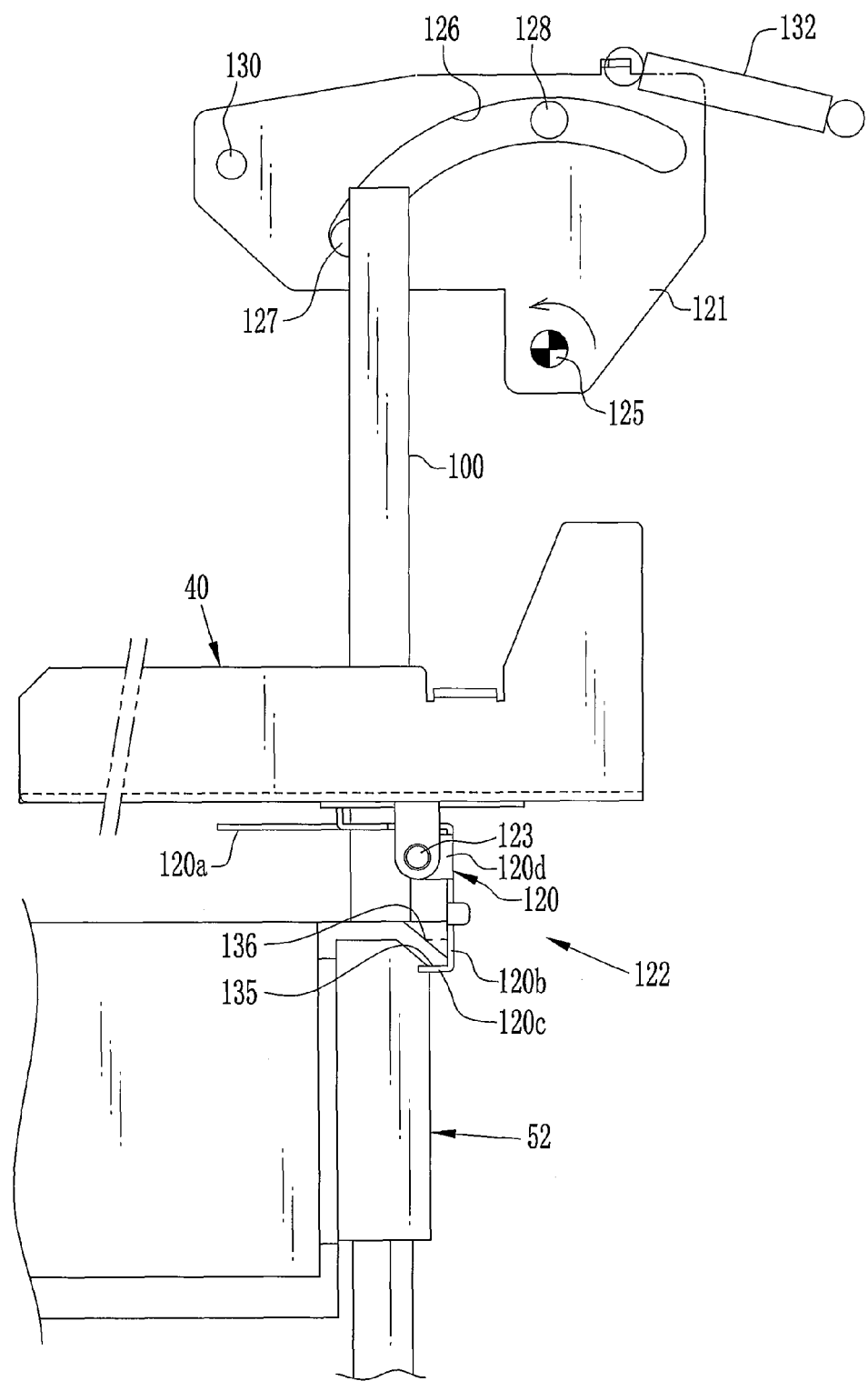
FIG. 20 is a side elevation, partially broken, illustrating a coupling device of another preferred embodiment.
Figure 21:
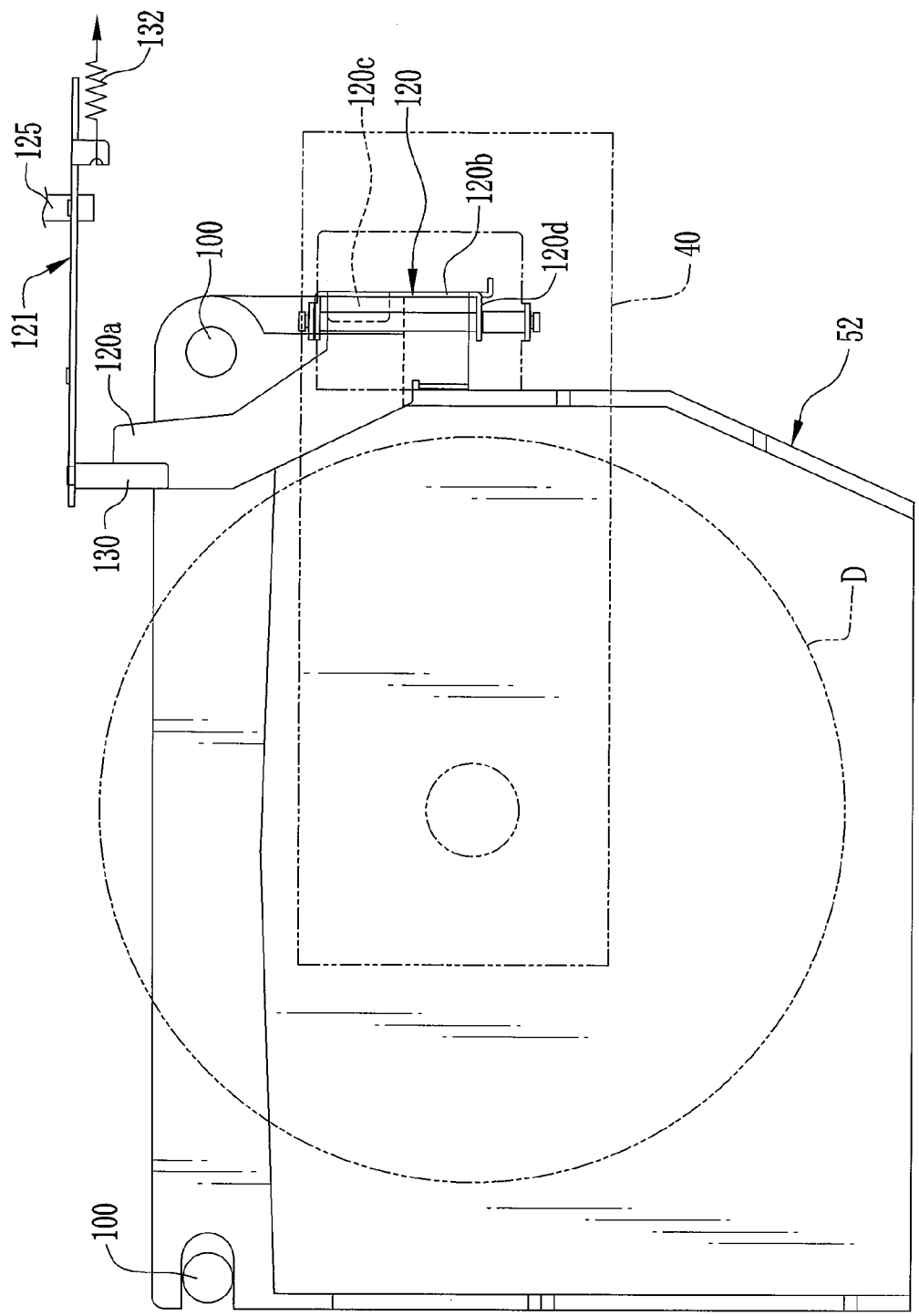
FIG. 21 is an explanatory view in a plan illustrating the same as FIG. 20.
Figure 23:
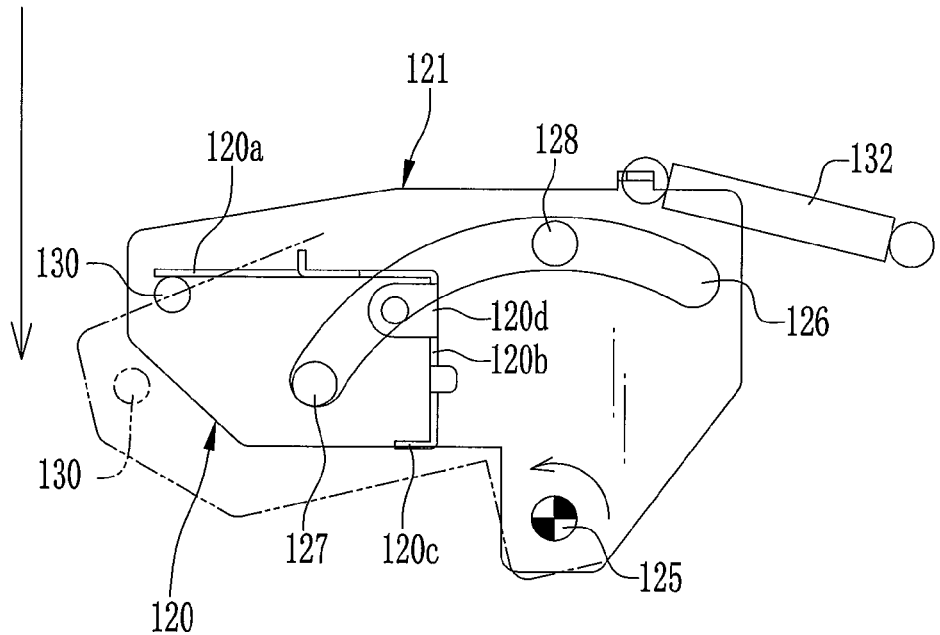
FIG. 23 is an explanatory view illustrating a state of a release lever in the course of moving down of the disk transfer device.

When the disk transfer device 40 moves down with a new processed disk D, the release lever 121 rotates counterclockwise against the tension coil spring 132 in FIG. 23 to come to the position of the phantom line. The lever portion 120a runs to pass by the release pin 130. The disk transfer device 40 moves further downwards. In FIG. 20, the disk transfer device 40 reaches a lower end position. The retention claw 120c can be retained on the claw receiving surface 135 after running over by use of the inclined guide surface 136. The disk transfer device 40 can move up to position the chute structure 52 at a required one of the sorting trays 28.

Furthermore, it is possible to dispose an electromagnet (not shown) on one of the chute structure and the disk transfer device or disk carrier or arm, instead of the mechanical linking of the chute structure and the disk transfer device with the retention mechanism. The chute structure may be retained with the disk transfer device by magnetic attraction.

Figure 24:
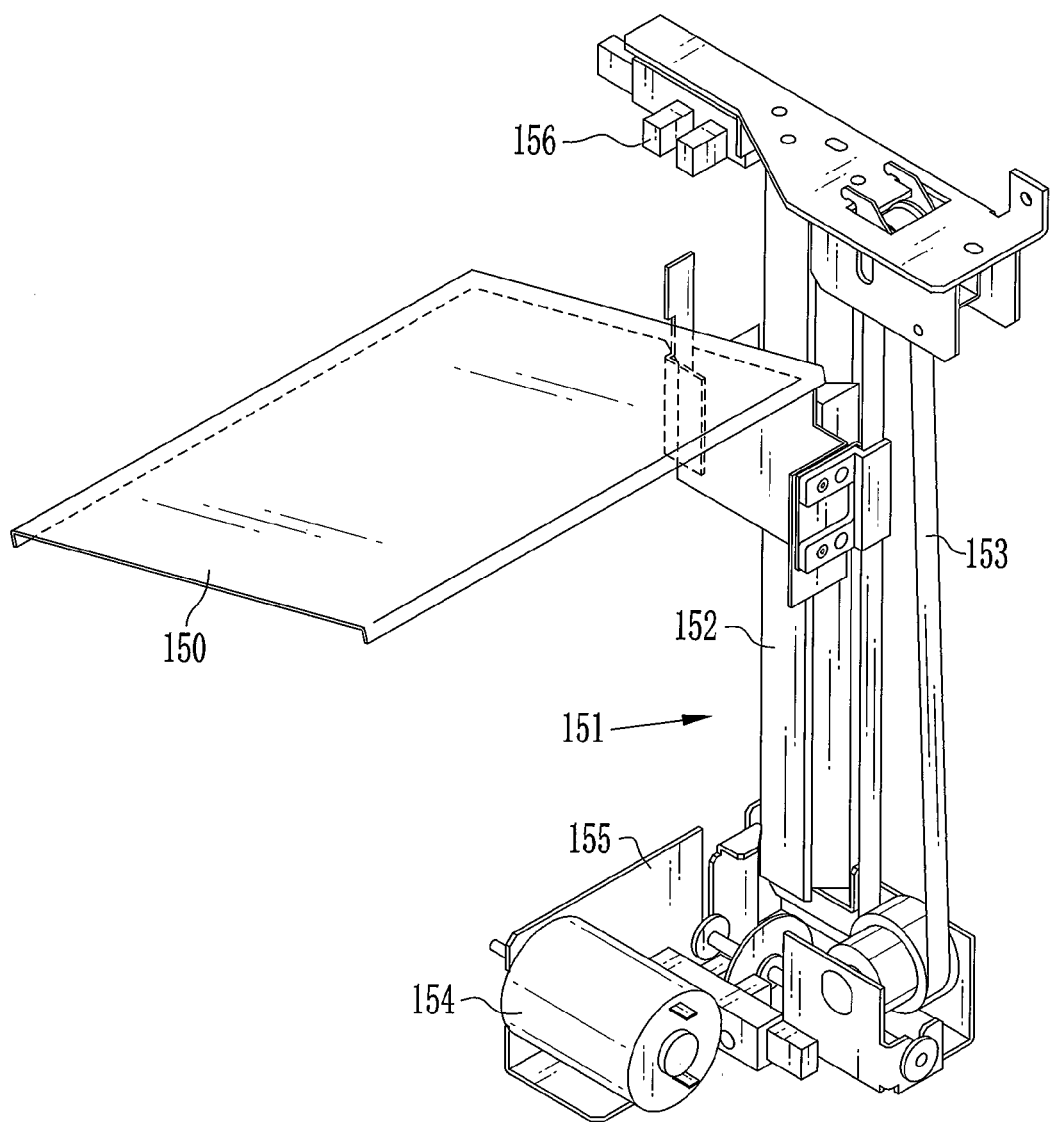
FIG. 24 is a perspective view illustrating still another preferred embodiment having a movable chute structure of a directly driven type.

In FIG. 24, another preferred movable chute structure 150 or ramp structure is illustrated. A lifting device 151 is associated with the chute structure 150 in a manner similar to the lifting device 56 of the disk moving assembly 23, for positioning the chute structure 150 for each of the sorting trays 28. A rail frame 152 for guiding as rail portion extends vertically, and supports the chute structure 150 in a movable manner. The lifting device 151 has a timing belt 153, a lift motor 154 and a speed reduction mechanism 155. The timing belt 153 is turned by the lift motor 154 in connection with the speed reduction mechanism 155, to move the chute structure 150 up or down to any required position. A photo sensor 156 as an origin sensor detects an original position of the chute structure 150. An amount of rotation of the lift motor 154 is controlled according to the original position from the photo sensor 156. Thus, the chute structure 150 can be positioned at each of the sorting trays 28.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A disk sorter comprising:
   plural sorting trays, arranged with an inclination and in a multi-level arrangement, having a front tray end and a rear tray end, for containing a disk upon passing said rear tray end so as to enable takeout of said disk at said front tray end;
   a chute structure, disposed behind said plural sorting trays, for moving up and down to a position of a path of a selected one of said plural sorting trays;
   a disk transfer device for holding said disk in a removable manner, and for releasing said disk on to said chute structure, to transfer said disk into said selected one of said plural sorting trays from said chute structure;
   a disk moving assembly for moving said disk transfer device up or down; and
   a coupling device for retaining said chute structure on said disk transfer device in a disengageable manner, so as to move said chute structure together with said disk transfer device up or down in a retained state.

2. A disk sorter as defined in claim 1, wherein said plural sorting trays are movable rotationally about a point located close to said rear tray end so as to raise said front tray end.

3. A disk sorter as defined in claim 2, further comprising at least one rail portion for guiding said chute structure to move up or down.

4. A disk sorter as defined in claim 1, wherein said coupling device retains said chute structure in an initial position on said disk transfer device while said disk transfer device moves down with said disk.

5. A disk sorter as defined in claim 4, wherein after placement of said disk on to said chute structure from said disk transfer device, said disk transfer device is released from said retained state upon moving down to said initial position.

6. A disk sorter as defined in claim 4, further comprising a stationary sorting tray, disposed under said plural sorting trays, and oriented at a path of said chute structure set in said initial position.

7. A disk sorter as defined in claim 4, wherein said coupling device comprises:
   a claw receiving surface formed on said chute structure; and
   a retention claw, disposed on said disk transfer device, for engaging with said claw receiving surface for retention upon rotation of said disk transfer device laterally at a predetermined angle.

8. A disk sorter as defined in claim 4, wherein said coupling device comprises:
   a retaining surface formed on said chute structure;
   a retention lever, disposed on said disk transfer device, having resiliency, for engaging with said retaining surface after passing said retaining surface while said disk transfer device moves toward said chute structure in said initial position; and
   a release portion for disengaging said retention lever from said retaining surface upon moving said chute structure higher than a group of said plural sorting trays, to move down said chute structure to said initial position by weight.

9. A disk processor comprising:
   a disk storage unit for containing an unprocessed disk in a stacked manner;
   a disk processing unit for processing said unprocessed disk in data writing and/or surface printing;
   plural sorting trays, arranged with an inclination and in a multi-level arrangement, having a front tray end and a rear tray end, for containing said processed disk upon passing said rear tray end so as to enable takeout of said processed disk at said front tray end;
   a chute structure, disposed behind said plural sorting trays, for moving up and down to a position of a path of a selected one of said plural sorting trays, to transfer said processed disk into said selected one of said plural sorting trays;
   a disk transfer device for holding said disk in a removable manner before or after processing;
   a disk moving assembly for moving said disk transfer device, to transfer said unprocessed disk from said disk storage unit to said disk processing unit, and to transfer said processed disk from said disk processing unit to said chute structure; and
   a coupling device for retaining said chute structure on said disk transfer device in a disengageable manner, so as to move said chute structure together with said disk transfer device up or down in a retained state.

10. A disk processor as defined in claim 9, wherein said disk moving assembly rotates said disk transfer device and also moves up or down said disk transfer device.

11. A disk processor as defined in claim 10, wherein said disk processing unit comprises a tray mechanism movable between a first position disposed to project from a chamber therein and a second position contained therein.

12. A disk processor as defined in claim 11, wherein said first position is located on a first vertical line, and said chute structure is located under said first position and aligned on said first vertical line.

13. A disk processor as defined in claim 11, wherein said disk storage unit is located on a second vertical line which is defined by rotationally shifting said disk transfer device from said first vertical line by a predetermined angle difference.

14. A disk processor as defined in claim 13, further comprising a processed disk storage unit, disposed under said disk storage unit and on said second vertical line, for containing said processed disk from said disk processing unit when any one of said plural sorting trays is loaded with said processed disk or in case of having priority over said plural trays.

* * * * *

UNITED STATES PATENT AND TRADEMARK OFFICE
CERTIFICATE OF CORRECTION

PATENT NO. : 8,352,972 B2
APPLICATION NO. : 12/622370
DATED : January 8, 2013
INVENTOR(S) : Satoru Inoue It is certified that error appears in the above-identified patent and that said Letters Patent is hereby corrected as shown below:

In the Claims:

Column 16, line 6, Claim 14:
"disk or in case of having priority over said plural trays." should read, --disk or in case of having priority over said plural sorting trays.--

Signed and Sealed this
Twenty-seventh Day of August, 2013

Teresa Stanek Rea
*Acting Director of the United States Patent and Trademark Office*